US012587520B2

(12) United States Patent  
Dietrich

(10) Patent No.: US 12,587,520 B2  
(45) Date of Patent: Mar. 24, 2026

(54) PERSONALIZED, SERVER-SPECIFIC AUTHENTICATION MECHANISM

(71) Applicant: Bundesdruckerei GMBH, Berlin (DE)

(72) Inventor: Frank Dietrich, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 305 days.

(21) Appl. No.: 17/912,116

(22) PCT Filed: Mar. 25, 2021

(86) PCT No.: PCT/EP2021/057752  
§ 371 (c)(1),  
(2) Date: Sep. 16, 2022

(87) PCT Pub. No.: WO2021/198017  
PCT Pub. Date: Oct. 7, 2021

(65) Prior Publication Data  
US 2023/0133418 A1 May 4, 2023

(30) Foreign Application Priority Data  
Mar. 31, 2020 (DE) .................... 10 2020 108 828.0

(51) Int. Cl.  
*H04L 9/40* (2022.01)

(52) U.S. Cl.  
CPC ...... *H04L 63/0823* (2013.01); *H04L 63/0869* (2013.01); *H04L 63/18* (2013.01)

(58) Field of Classification Search  
None  
See application file for complete search history.

(56) References Cited

U.S. PATENT DOCUMENTS

| 8,171,531 B2 * | 5/2012 | Buer | ................... H04W 12/069 |
| | | | 380/278 |
| 8,806,582 B2 * | 8/2014 | Dietrich | ............. H04L 63/0853 |
| | | | 726/4 |
| 9,032,212 B1 * | 5/2015 | Juels | ..................... H04L 9/3226 |
| | | | 713/176 |

(Continued)

FOREIGN PATENT DOCUMENTS

| WO | WO-2009/001197 A2 | 12/2008 |
| WO | WO-2019132646 A1 * | 7/2019 | ........... H04L 9/3242 |

OTHER PUBLICATIONS

International Search Report and Written Opinion for International Application No. PCT/EP2021/057752 dated Jul. 13, 2021.

*Primary Examiner* — Syed A Zaidi  
*Assistant Examiner* — Vadim Savenkov  
(74) *Attorney, Agent, or Firm* — Harness, Dickey & Pierce, P.L.C.

(57) ABSTRACT

The authentication mechanism provides a personalized, server-specific authentication of a user with respect to a service server using an authentication token. The method includes a registration of a user with a service server, which includes a creation of a personalized user account for the user with the service server. Furthermore, a server-specific, asymmetric cryptographic key pair is generated for the user by an authentication token, the key pair including an authentication key and an authenticating key. The authenticating key is made available to the service server and assigned to the personalized user account thereby.

21 Claims, 10 Drawing Sheets

(56)          References Cited

U.S. PATENT DOCUMENTS

Figure 1:
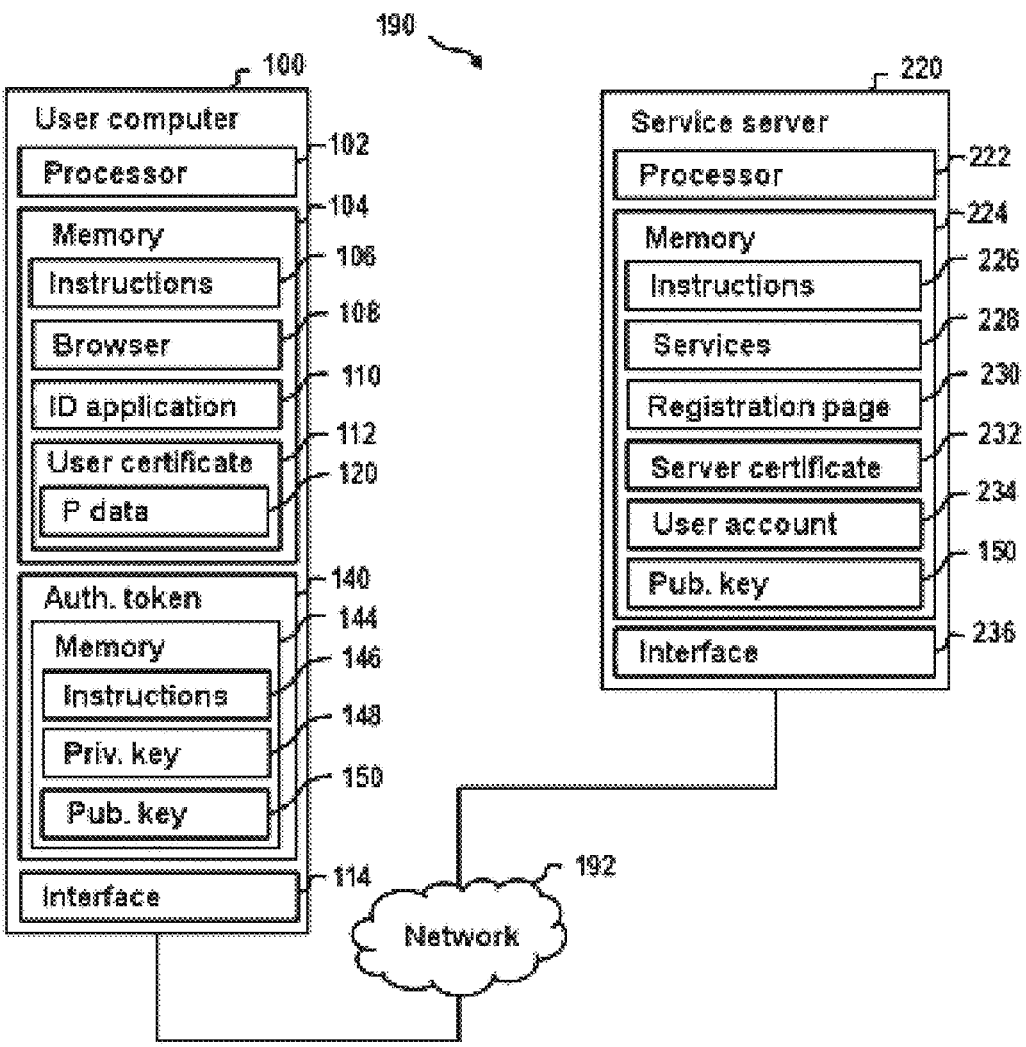

| | | | | |
|---|---|---|---|---|
| 9,323,909 | B1 | 4/2016 | Luo et al. | |
| 11,032,713 | B2 * | 6/2021 | Park | H04L 63/0823 |
| 11,290,269 | B2 * | 3/2022 | Arumugam | H04L 9/30 |
| 2003/0177363 | A1 * | 9/2003 | Yokota | H04L 9/0866 |
| | | | | 713/176 |
| 2006/0034494 | A1 * | 2/2006 | Holloran | H04L 9/3231 |
| | | | | 382/116 |
| 2007/0118891 | A1 | 5/2007 | Buer | |
| 2009/0265546 | A1 * | 10/2009 | Nasu | H04L 63/0823 |
| | | | | 713/156 |
| 2010/0049984 | A1 * | 2/2010 | Masushio | H04L 63/0853 |
| | | | | 713/179 |
| 2013/0318354 | A1 * | 11/2013 | Entschew | H04L 9/3247 |
| | | | | 713/175 |
| 2015/0143125 | A1 * | 5/2015 | Nix | H04L 9/3066 |
| | | | | 713/171 |
| 2016/0006566 | A1 * | 1/2016 | Morgner | H04L 9/0841 |
| | | | | 713/185 |
| 2018/0048472 | A1 * | 2/2018 | Pirrwitz | H04L 63/0876 |
| 2019/0230087 | A1 * | 7/2019 | Gharout | H04W 12/35 |
| 2019/0312730 | A1 * | 10/2019 | Engan | H04L 63/126 |
| 2020/0036707 | A1 * | 1/2020 | Callahan | H04L 67/53 |
| 2021/0110027 | A1 * | 4/2021 | Stohr | G06Q 20/3672 |
| 2022/0051498 | A1 * | 2/2022 | Hart | H04W 12/03 |

* cited by examiner

190

| Call up registration web page | 300 |
| Receive 1st request | 302 |
| Set up encrypted channel | 304 |
| Forward proof of authorization | 306 |
| Receive 2nd request | 306 |
| Forward challenge | 310 |
| Receive response with authenticating key | 312 |
| Forward response with authenticating key | 314 |

| Call up registration web page | 400 |
| Set up encrypted channel | 402 |
| Receive 1st request | 404 |
| Initiate read-out | 406 |
| Forward personalization data | 408 |
| Forward proof of authorization | 410 |
| Receive 2nd request | 412 |
| Forward challenge | 414 |
| Receive response with authenticating key | 416 |
| Forward response with authenticating key | 418 |

| Call up registration web page | 500 |
| Call up encrypted channel | 502 |
| Receive 1st request | 504 |
| Initiate read-out | 506 |
| Set up encrypted channel | 508 |
| Read access | 510 |
| Forward personalization data | 512 |
| Forward proof of authorization | 514 |
| Provide authenticating key | 516 |

PERSONALIZED, SERVER-SPECIFIC AUTHENTICATION MECHANISM

CROSS-REFERENCE TO RELATED APPLICATIONS

This application is a national phase under 35 U.S.C. § 371 of PCT International Application No. PCT/EP2021/057752 which has an International filing date of Mar. 25, 2021, which claims priority to German Application No. 102020108828.0, filed Mar. 31, 2020, the entire contents of each of which are hereby incorporated by reference.

DESCRIPTION

The invention relates to a method for implementing an authentication mechanism and a user computer system and a system for executing the method.

In the course of increasing digitization and networking, services provided via networks such as the Internet are taking on an increasingly important position both in everyday life and in professional life. For example, in order to be able to use user-specific or access-restricted services, the user must authenticate himself to a service server via the network. For example, the user uses a user name and password for logging in to the service server. The user enters the user name and authenticates himself by means of his password.

The service server then performs authenticating of the user by verifying that the password provided is correct for the user name used. Only when said verification is successful and the user thus receives authenticating by the service server is the user assigned access authorizations as part of an authorization by the service server, for example, for the duration of a session.

However, entering a user name and password is cumbersome for the user, for example, due to the input, and input errors can easily occur. The user must remember the relevant information and there are security risks if the user stores the relevant information somewhere, for example, in writing. There are further security risks when entering the relevant information, for example, through "shoulder surfing", whereby an unauthorized third party observes the user's input sequence on a keyboard, for example, in order to use it later for unauthorized access to the service server.

There are various approaches for solving the above problems. However, a fundamental problem when implementing authentication mechanisms is that in order to use a personalized service provided by a service server, the user must first register with the service server. To do this, the user enters his personalization data during the registration process, for example, via a web form. Similar problems as the ones mentioned above arise: The input is cumbersome, input errors can easily occur and there are security risks when inputting by the user.

In contrast, the invention is based on the object of creating an improved method for implementing an authentication mechanism.

The object on which the invention is based is achieved in each case with the features of the independent patent claims. Embodiments of the invention are specified in the dependent claims.

Embodiments comprise a method for implementing an authentication mechanism using a user computing system. The authentication mechanism provides a personalized, server-specific authentication of a user with respect to a service server using an authentication token.

The method comprises:

calling up a registration web page provided by the service server for registering the user with the service server through the user computer system via a network using a browser application, in the course of the calling up of the registration web page, a first encrypted communication channel between the user computer system and the service server being set up, the user computer system authenticating the service server in the course of the setting up of the first encrypted communication channel using a service server certificate, the registration of the user comprising creating a personalized user account for the user through the service server, setting up a parallel second encrypted communication channel between the user computer system and the service server, in the course of the setting up of the second encrypted communication channel, a mutual authenticating of user and service server taking place using a user certificate and the service server certificate, receiving a first request from the service server by the user computer system for providing personalization data of the user for personalizing the user account, initiating a read-out of the personalization data to be provided by the user computer system from an electronic personalization data source, a read-out of the personalization data to be provided requiring a successful authentication of the user with respect to the personalization data source, forwarding of the read-out personalization data from the personalization data source by the user computer system to the service server via the second encrypted communication channel, forwarding of a proof of authorization of the user to use the personalization data as his own personalization data by the user computer system to the service server via the second encrypted communication channel, receiving a second request from the service server by the user computer system using the browser application via the first encrypted communication channel for providing a server-specific authenticating key for the future authenticating of the user of the personalized user account, the second request comprising a first challenge, forwarding the first challenge from the user computer system to an authentication token of the user, receiving a first response to the first challenge created from the authentication token by the user computer system together with a server-specific authenticating key for the service server in the form of a public cryptographic key of an asymmetric cryptographic key pair generated from the authentication token using a unique service-server attribute, the first response comprising a signature of the first challenge with a server-specific authentication key associated with the authenticating key in the form of a private cryptographic key of the generated asymmetric cryptographic key pair, a creation of the first response requiring successful authenticating of the user with respect to the authentication token, forwarding the first response and the server-specific authenticating key by the user computer system using the browser application via the first encrypted communication channel to the service server for storing the server-specific authenticating key in connection with the user's personalized user account, the first response serving as proof that the user has the authentication key associated with the authenticating key, the stored authenticating key enabling the service server to verify a validity of a second response provided by the user as a proof of authentication with a second signature of a second challenge from the service server in the course of future user authenticatings, which was created using the server-specific authentication key and assigned to the user's personalized user account.

Embodiments can have the advantage that the user is not required to enter personalization data in the course of the user's registration. Rather, a cryptographically secured method is provided, in which the corresponding personalization data are read out from an electronic personalization source. Since the user computer system authenticates itself with respect to the service server in the course of the registration with the user certificate, the server knows who is providing the corresponding personalization data. The proof of authorization proves that the user is actually allowed to use the personalization data provided for this purpose, namely, that it is his personalization data. Said proof of authorization can be, for example, a signature with a private cryptographic key, which belongs to a public cryptographic key, the authenticity of which is secured by means of a certificate, which at the same time secures the authenticity of the personalization data. The user's power of disposal over the corresponding private cryptographic key for creating a signature proves the user's authorization for using the personalization data. Alternatively, the proof of authorization can be provided or proven indirectly by a trusted third party, such as an ID provider server. For example, the ID provider server reads out the personalization data and confirms, for example, through a signature of the read-out data, that said personalization data were read out from the user's predetermined personalization source. The fact that the user has the power of disposal over the corresponding predetermined personalization source and makes said personalization source available for the ID provider server for reading out the personalization data results in the user's authorization for using the personalization data. The fact that the user is actually the user whose personalization data is stored in the personalization source can be ensured by the need for a successful authenticating of the user with respect to the personalization source. This can, for example, prevent the personalization source from being stolen and used by an unauthorized third party.

The method can thus ensure the authenticity of the personalization data provided, and the fact that the use of the personalization data for the purpose of registration was actually authorized by the authorized user.

Said personalization data is used to personalize the user account. An authenticating key is provided to the service server for future user authenticatings. Said authenticating key is transmitted via the same encrypted communication channel via which the implementation of the authentication mechanism was previously initiated, that is, via which the registration web page was called up. This means that the same ephemeral keys are used to encrypt the transmission. In addition to the service server, only the user computer system that has proven by successfully providing the authentic personalization data that it is an authorized and competent broker of the corresponding personalization data that has said key. The authenticating key is thus linked to the personalization data in a cryptographically secured manner based on the transmission via the same encrypted communication channel. Said link is fixed by the service server in that the service server stores the server-specific authenticating key in connection with the user's previously personalized user account. The authenticating key, which itself does not represent and/or disclose any personal data of the user, is thus linked to the personalization data by the service server. The authenticating key can therefore enable the service server to identify a user having undergone authenticating as the user to whom the personalization data is assigned. Consequently, a personalized authentication/authenticating of the user can be made possible without the personal data being transmitted in the course of the authentication/authenticating. Anyone else, apart from the service server, cannot assign any personal data to the data transmitted in the course of an authentication, such as a response encrypted with the authentication key in the course of a challenge-response protocol.

The use of a unique service server attribute when generating the asymmetric key pair from authentication key and authenticating key can ensure that different and thus server-specific key pairs are generated for different service servers.

Embodiments can have the further advantage that, when using server-specific cryptographic keys, the recipient cannot see or determine what further authentication options the authentication token, and thus the user, has on which further service servers. The present implementation method can be carried out, for example, against a plurality of service servers, the user registering with each of the service servers and the authentication token for each of the service servers creating a server-specific asymmetric cryptographic key pair consisting of an authentication key and an authenticating key. The authentication token can thus a plurality of server-specific authentication keys for authenticating the user with respect to the respective service server of a plurality of service servers. The respective service servers or web services cannot reach any conclusions about other authentication mechanisms or authentication options of the authentication token or the user of the authentication token from the individual authentication mechanisms with respect to other service servers or web services.

Finally, using a challenge-response method using an authentication key provided in an electronically and cryptographically secured form by means of an authentication token enables a fully electronic and secure authentication or authenticating of the user. For example, the user does not have to enter any data for authentication. But even if the user enters a PIN for authentication with respect to the authentication token, for example, in order to be able to use said PIN or the authentication key stored therein for authentication purposes with respect to a service server, the user only has to remember one PIN, for example, to be able to use a plurality of stored authentication keys for a plurality of service servers. Furthermore, this approach can offer more security, since even if the PIN is spied out, misuse is not possible as long as the authentication token is in the user's possession.

Authentication refers to providing evidence of a claimed property, such as a property of a user. Authenticating means verifying the claimed property using the evidence provided. successful authenticating of the user with regard to the claimed property, for example, the authenticity of his person or identity, allows the user that has undergone authenticating to carry out further actions. For example, the user is granted access rights. A user that has successfully undergone authenticating is considered authentic. Final confirmation of an authenticating may comprise authorization.

An authentication key is understood here as a cryptographic key, such as a private cryptographic key of an asymmetric key pair, which is used to provide a proof of a claimed property, for example, for creating a response to a challenge in the course of a challenge-response method. After it has been generated by the authentication token, the authentication key is stored, for example, in a protected memory area of the authentication token.

An authenticating key is understood here as a cryptographic key, such as a public cryptographic key of an asymmetric key pair, which is used for verifying a proof of a claimed property, for example, for verifying a response to a challenge in the course of a challenge-response method. After it has been generated by the authentication token, the authenticating key is stored, for example, in the memory of the authentication token and is sent to the service server in the course of the implementation of the authentication mechanism.

The user can undergo authenticating with respect to the personalization data source and/or the authentication token in various ways. For example, using an authenticating sensor, the user can provide proof of knowledge, such as a PIN or password, a proof of possession, such as a cryptographic key, a certificate or electronic device, and/or a proof of properties of himself, such as biometric traits or behavioral characteristics.

The authenticating sensor can be provided, for example, by the personalization data source or the authentication token and/or by the user computer system which is communicatively connected to the personalization data source or the authentication token or comprises it.

An authenticating sensor is understood to be a sensor for detecting authentication data or proof for the purpose of authenticating the user, by means of which the user can undergo authenticating. The authentication data can comprise, for example, the user's biometric data. For example, the authenticating sensor may be configured for capturing biometric data from the user. Biometric data can comprise, for example: fingerprint data, body geometry data/anthropometry data such as face, hand, ear geometry data, palm structure data, vein structure data such as palm vein structure data, iris data, retina data, voice recognition data, nail bed patterns. The authenticating sensor can be used, for example, for detecting behavioral data on the user, such as gross and/or fine motor movement patterns. Gross motor movement patterns are, for example, movement patterns of the user when walking or moving his arms. Fine motor movement patterns are, for example, movement patterns of the user when moving hands, fingers or head. For example, the authenticating sensor is configured to be carried by the user, for example, in the hand, on the head or otherwise on the body, and to move with the user's movements and thus to capture the user's movements as authentication data for the purpose of authenticating. The authentication data can, for example, comprise knowledge of the user, such as a PIN or password. The authenticating sensor can comprise an input device for entering authentication data, such as a PIN or a password. The input device can comprise a keyboard and/or a touchscreen, for example.

A web page refers to a document provided by a server for calling up via the Internet or World Wide Web, the document being able to be accessed with a browser application by specifying an address or Uniform Resource Identifier (URI), such as a Uniform Resource Locator (URL), of the web page. Web pages usually consist of structured text, into which images, sound and/or video files can be integrated. A web page may also contain links, that is, references, to other web pages or content. Web pages can have static predefined or dynamically generated content. The references can be, for example, a URI for calling up a web service. A web service provides, for example, an interface for machine-to-machine or application communication, for example, based on HTTPS, via a network such as the Internet. For example, data can be exchanged and functions can be called up on remote computer systems, such as servers. A web service has a URI that can uniquely identify the web service. Furthermore, the web service can have an interface description in machine-readable format, such as an XML artifact such as WSDL. The interface description defines how to interact with the web service. For example, the communication can run via protocols from the Internet context such as HTTPS. For example, said communication can be XML or JSON based.

Asymmetric key pairs are used for a variety of cryptosystems and play an important role in the secure transmission of electronic data. An asymmetric key pair consists of a public key, which is used to encrypt and/or decrypt data and may be passed on to third parties, for example, to a sender or recipient of data, and a private key, which is used for encryption and/or decryption but is also used to sign data and usually has to be kept secret. The public key allows anyone to encrypt data for the owner of the private key or to verify digital signatures created with the private key. A private key enables its owner to decrypt data encrypted with the public key or to create digital signatures of data.

A digital signature of data comprises, for example, a forming of a check value of the data, such as a hash value, which is encrypted using a private cryptographic key of an asymmetric key pair used as the signature key. In the case of a signature, only the signer knows the private cryptographic key used for creating the signature, that is, signature key, of the asymmetric key pair used for the signature. The recipient of the signature only has the public key, that is, the signature verification key, of the asymmetric key pair used for the signature. The recipient of the signature can therefore verify the signature, but cannot calculate it himself. For a signature verification, the signature recipient calculates the verification value of the signed data, for example, and compares said verification value with the result of a decryption of the signature using the signature verification key. If the calculated hash value matches the result of the decryption, the signature is correct. If the authenticity of the signature verification key is also confirmed, for example, by a certificate, in particular a PKI certificate, the signature is valid.

A "certificate" is understood here as a digital certificate, which is also referred to as a public key certificate (PKI certificate). A certificate is structured data used to assign a public key of an asymmetric cryptosystem to an identity, such as a person, institution, or device. Said certificates are signed by a certificate issuer for cryptographic security and to prove the authenticity of the certificate data. A so-called Public Key Infrastructure (PKI) is implemented through PKI certificates, which are based on asymmetric key pairs and, with the exception of a root certificate, are each signed by a certificate issuer with a signature key whose associated signature verification key is assigned to the certificate issuer by a PKI certificate from the corresponding certificate issuer. For example, the certificate can conform to the X.509 standard or another standard. For example, the certificate is a Card Verifiable Certificate (CVC). An authorization certificate comprises structured data which additionally define identity rights.

The PKI provides a system for issuing, distributing, and verifying digital certificates. A digital certificate can confirm the authenticity of a public cryptographic key and its permitted use and scope in an asymmetric cryptosystem. The digital certificate itself is protected by a digital signature, the authenticity of which can be verified using the public key of the issuer of the certificate. A digital certificate is again used to verify the authenticity of the issuer key. A chain of digital certificates can be built up in this way, each of which confirms the authenticity of the public key with which the previous certificate can be verified. Such a chain of certificates forms a so-called validation path or certification path. The participants in the PKI must be able to rely on the authenticity of the last certificate, the so-called root certificate, and the key certified thereby, for example, without a further certificate. The root certificate is managed by a so-called root certification authority, the authenticity of all certificates of the PKI being based on the authenticity assumed to be guaranteed.

Digital certificates, for example, are confirmed by an independent, credible entity (certification service provider/ZDA or trust service provider/VDA), that is, the certification body that issues the certificate. Certificates can be made available to a wide range of people to enable them to verify electronic signatures for authenticity and validity. A certificate can be assigned to an electronic signature and provide a signature verification key in the form of the public key if the private key associated with the signature verification key was used as the signature key. Because a ZDA/VDA provides a certificate associated with a public key to the general public, it enables users of asymmetric cryptosystems to assign the public key to an identity, for example, a person, an organization or a computer system.

A challenge-response method represents a secure authenticating method of a first entity with respect to a second entity based on knowledge. For example, the user can undergo authenticating using a challenge-response method. The challenge-response method is used, for example, to prove that the user possesses an authentication key, for example, in an authentication token. For example, the response also represents a confirmation of a successful user authenticating by the authentication token if the response is only generated on the condition of a successful user authenticating by the authentication token. Thus, in the case of a successful challenge-response method, the service server not only knows that the user authenticating is confirmed, but that it is confirmed by the authentication token and is therefore valid.

In the course of a challenge-response method, a first entity presents a second entity with a task ("challenge"), for which the second entity must provide a correct answer ("response"). By providing the correct answer, the second entity proves that it knows certain information that is a secret. The first entity has means that verify the correctness of the answer. The advantage here is that the secret is not transmitted and therefore cannot be compromised by the data exchange in the course of the challenge-response method.

For example, the first entity generates a random number ("nonce") and sends it to the second entity as a challenge. The second entity uses the secret for a cryptographic transformation of the nonce and sends the result as a response to the first entity for the purpose of an authenticating of the second entity. For example, the nonce is encrypted. In addition, the nonce can be combined with additional data, for example. For example, the shared secret, such as a private cryptographic key, can be used for encrypting the nonce. The first entity, which knows both the nonce and means for decrypting the response, such as a public cryptographic key assigned to the private cryptographic key used for encryption, can, for example, execute an inverse calculation like the second entity, for example, decrypt the encrypted nonce and match against the nonce sent as a challenge. If the result of the calculation by the first entity matches the challenge, the challenge-response method is successful and the second entity has successfully undergone authenticating.

A computer or computer system can be, for example, a stationary computer, such as a personal computer (PC), service terminal, or server, or a mobile, portable computer, such as a laptop, tablet, smartphone, or other smart device. The computer may comprise an interface for connection to the network, said network possibly being private or public, in particular the Internet. Depending on the embodiment, said connection can also be established via a cellular network.

A "user computer system" is understood here as a computer system to which the user has access. This can be, for example, a desktop computer (PC), a service terminal, or a mobile, portable communication device such as a laptop, tablet, smartphone or other smart device.

A "service server" is understood here as a server or a computer system on which a server program is executed and which provides the option of initiating or using and/or executing an offered service via a network.

A "program" or "program instructions" is understood here as without limitation any type of computer program that comprises machine-readable instructions for controlling a functionality of the computer.

A "processor" is understood here and in the following as a logic circuit that is used to execute program instructions. The logic circuit can be implemented on one or more discrete components, in particular on a chip. In particular, a "processor" is understood as a microprocessor or a microprocessor system made up of a plurality of processor cores and/or a plurality of microprocessors.

A "memory" is understood here as both volatile and non-volatile electronic memory or digital storage media.

A "non-volatile memory" is understood here as an electronic memory for the permanent storage of data, in particular of static cryptographic keys, attributes or identifiers. Non-volatile memory can be configured as non-alterable memory, also known as read-only memory (ROM), or as alterable memory, also known as non-volatile memory (NVM). In particular, this can be an EEPROM, for example, a flash EEPROM, referred to as flash for short. A non-volatile memory is characterized by the fact that the data stored thereon are retained even after the power supply has been switched off.

A "protected memory area" is understood here as an area of an electronic memory that can only be accessed, that is, read access or write access, via a processor of the corresponding computer system or a security module comprised in the corresponding computer system. According to embodiments, access from the processor coupled to the memory is only possible if a condition required therefor is met. This can be a cryptographic condition, for example, in particular a successful authenticating and/or a successful authorization check.

An "interface" or "communication interface" is understood here as an interface via which data can be received and sent, it being possible for the communication interface to be configured with or without contact. A communication interface can enable communication via a network, for example. Depending on the configuration, a communication interface can, for example, provide wireless communication based on a mobile radio standard, Bluetooth, RFID, WiFi and/or NFC standard. Depending on the configuration, a communication interface can provide a cable-based communication, for example. The communication interface can be an internal interface or an external interface.

The encrypted communication channels are, for example, encrypted end-to-end connections. An "encrypted end-to-end connection" or an "encrypted end-to-end transmission channel" is understood here as a connection between a transmitter and a receiver with end-to-end encryption, in which the data to be transmitted are encrypted by the sender and only decrypted again by the receiver. The encryption of transmitted data thus takes place across all transmission stations, so that intermediate stations cannot gain knowledge of the content of the transmitted data due to the encryption. The connection is cryptographically secured by the encryption in order to prevent spying and/or manipulation of the transmission, a so-called secure messaging method being able to be used for this purpose. End-to-end encryption is based, for example, on two symmetrical cryptographic keys, a first of the symmetrical keys being used for encrypting messages and a second of the symmetrical keys being used for authenticating the sender of the message, for example, using Message Authentication Code (MAC) algorithms. For example, for an encrypted communication channel, ephemeral keys for encryption are negotiated in the course of the setup, the ephemeral keys losing their validity when the communication channel is terminated. Using different ephemeral keys for different communication channels makes it possible to operate a plurality of communication channels in parallel.

An encrypted communication channel can be established, for example, using the Transport Layer Security (TLS) protocol, for example, as part of the Hypertext Transfer Protocol Secure (HTTP) protocol.

"Personalization data" is data for personalizing a user account of the user with a service server. The service server can, for example, identify the user based on the personalization data and/or use said personalization data for providing personal services. Personalization data comprises, for example, one or more attributes of the user, which are personal data of the user, such as surname, first name, address, for example, country, city, street and/or house number, telephone number, e-mail address and/or date of birth. Personal data refers to data that enables a person to be identified or can be assigned to a person to whom the personal data relates.

Embodiments can have the advantage of providing a registration of a user with a web service provided by a service server using an electronic identity which is connected to a server-specific and thus service-specific key pair. The key pair is also user-specific and personalized due to the connection to the personalization data stored in the course of the registration. Using the key pair enables repeated authentication with respect to the service server or web service without the transmission of personal data, such as user names, passwords or identity attributes. For example, a challenge-response method can be used for authentication using the key pair.

Embodiments can have the advantage that the method for implementing the authentication mechanism provides a direct cryptographic link of a registration process using an electronic identity based on the personalization data with an initialization of one of the server-specific key pairs consisting of authentication and authenticating keys. The user is identified to the service server by providing the personalization data for the service server.

The method can thus enable secure identification of the user based on the stored personalization data using the server-specific cryptographic key pair.

Furthermore, embodiments can have the advantage of not requiring the use of additional services for executing authentication of the user with respect to the service server or authenticating of the user by the service server using the initialized server-specific key pair consisting of authentication and authenticating keys. According to embodiments, the implemented authentication mechanism only requires the authentication token with the authentication key for an authentication of the user with respect to the service server, while the service server can, for example, perform authenticating of the user solely by using the authenticating key. In other words, authentication tokens and service servers may suffice for successful authentication/authenticating.

According to embodiments, a key attestation for the keys of the authentication token can also be implemented, which can enable the service server to evaluate the key pair of authentication and authenticating keys used for the authentication mechanism. In the course of a key attestation, for example, the hardware managing or storing the keys confirms directly, using a cryptographic signature, how the keys are generated, stored and/or managed. The key attestation can therefore serve as proof of the security level of the keys. The possibility of attesting the respective hardware of the authentication token or device-specific implementation enables the service server or web service to get an idea of the security level of the tokens used and to decide on the acceptance of these tokens for the further process.

According to embodiments, the authentication mechanism provides a certificate-less authentication of the user with respect to a service server using an authentication token. For example, certificates are only used to implement the authentication mechanism, that is, initially. As soon as the mechanism is implemented, the user only needs the server-specific authentication key of the authentication token for the authenticating with respect to the service server. Said server-specific authentication key is the server-specific private cryptographic key of the authentication token, which is associated with the server-specific public cryptographic key that was made available to the service server in the course of the implementation of the authentication mechanism as an authenticating key for authenticating the user. The server-specific authentication key is used for generating a signature for authenticating the user with respect to the service server. The signature is, for example, a signature of a challenge in the course of a challenge-response method.

Communication between the user computer system and the service server takes place using the HTTPS protocol, for example. The communication is end-to-end encrypted, for example.

The personalization data is provided using the SAML protocol, for example. The first request from the service server is, for example, a SAML request, in response to which the read-out personalization data are provided in the form of a SAML response. SAML (Security Assertion Markup Language) is an XML framework for exchanging authenticating and authorization information, which provides functions to describe and transmit security-related information.

For example, the personalization data is provided using the SOAP protocol. SOAP (Simple Object Access Protocol) is a network protocol with the help of which data can be exchanged between systems and remote procedure calls can be carried out.

According to embodiments, the unique service server attribute is an address of the service server, for example, a domain name or sub-domain name. The use of a unique service server attribute when generating the asymmetric key pair from authentication key and authenticating key can ensure that different and thus server-specific key pairs are generated for different service servers.

According to embodiments, the server-specific asymmetric cryptographic key pair is generated using a secret of the authentication token. Embodiments can have the advantage that it can be ensured that the asymmetric cryptographic key pair generated is not only server-specific but also token-specific, that is, unique for the authentication token. The secret of the authentication token, such as a random number, is used as input, for example, in combination with the service server attribute, to a key generation algorithm for generating the asymmetric cryptographic key pair. As long as the corresponding secret is not known to anyone else, it can be ensured that the asymmetric cryptographic key pair cannot be duplicated.

According to embodiments, the authentication token is, for example, a FIDO2 token according to the FIDO2 standard of the FIDO Alliance and the W3C for authenticating via the Internet. FIDO2 is based on the W3C Web Authentication Standard (WebAuthn) for communication between server and browser and the Client to Authenticator Protocol (CTAP) of the FIDO Alliance, which describes communication between browser and authenticator. Taken together, the WebAuthn and CTAP protocol specify authenticating of a user by the server be means of the authenticator.

According to embodiments, the personalization data source is a memory of the user computer system and the personalization data source is read out by the user computer system.

According to embodiments, the user certificate comprises the user's personalization data to be provided and a public cryptographic key assigned to the user. A signature of the personalization data created by the user computer system using a private cryptographic key associated with the public cryptographic key of the user is used as a proof of authorization for the user to use the personalization data.

Embodiments can have the advantage that the user certificate implements a cryptographically secured link between the personalization data and the asymmetric key pair of the user, the public cryptographic key of which comprises the user certificate. The user certificate can, for example, authorize the owner of the associated private cryptographic key to use the personalization data, for example, to register with a service server. In this case, a signature of the personalization data with the corresponding private cryptographic key can serve as a proof of authorization. The user's power of disposal over the corresponding private cryptographic key provides proof based on the user certificate that the personalization data is being used by an authorized person, namely the user whose personalization data is concerned. The user certificate is stored, for example, in the memory of the user computer system and is sent from the user computer system to the service server in the course of the setting up of the second encrypted channel. The user's private cryptographic key associated with the user certificate is stored, for example, in a protected memory area of the memory of the user's computer system.

According to embodiments, the user certificate comprises at least part of the personalization data to be provided as plain text. Embodiments can have the advantage that the data comprised in the user certificate in plain text does not have to be additionally sent to the service server. The user certificate is sent to the service server, for example, during the mutual authenticating in the course of the setting up of the second encrypted channel. The corresponding personalization data is thus also transmitted in plain text.

An X.509 certificate, for example, comprises a name of the user ("distinguished name") to which the certificate refers. In other words, the corresponding X.509 certificate authenticates the public key of the subject or user who owns the corresponding private key. The user's name can comprise a plurality of attributes of the certificate holder, that is, the user, in plain text. Examples of information comprise the following: Common Name (CN), Organization (O), Organizational Unit (OU), Country/Region (C), State (ST), City (L). Furthermore, an X.509 certificate can comprise, for example, an e-mail address as an alternative name.

According to embodiments, the user certificate comprises all personalization data to be provided as plain text. The first request is received before the second encrypted communication channel is set up and the personalization data are forwarded in the form of the user certificate in the course of the mutual authenticating to set up the second encrypted communication channel from the user computer system to the service server. Embodiments can have the advantage that the personalization data to be provided are forwarded directly from the user computer system to the service server in the course of the mutual authenticating to set up the second encrypted communication channel and no additional sending of personalization data is necessary. The user certificate can be, for example, an X.509 certificate of version three or higher, in which at least some of the personalization data to be provided or all of the personalization data to be provided are comprised as extensions.

If the personalization data is already forwarded from the user computer system to the service server in the course of the mutual authenticating to set up the second encrypted communication channel, then, for example, only the user's proof of authorization to use the personalization data is then via the second encrypted communication channel in the form of a signature of the personalization data created by the user compute system using a private cryptographic key associated with the user's public cryptographic key.

According to embodiments, the first encrypted communication channel is set up between the browser application of the user computer system and the service server as endpoints. For example, the first communication channel is secured by means of an end-to-end encryption between the browser application of the user's computer system and the service server. According to embodiments, the second encrypted communication channel is set up between the browser application of the user computer system and the service server as endpoints. For example, the second communication channel is secured by means of an end-to-end encryption between the browser application of the user's computer system and the service server.

According to embodiments, the first request is received via the second encrypted communication channel and at least part of the personalization data is forwarded via the second encrypted communication channel in addition to the user certificate sent by the user computer system to the service server in the course of the mutual authenticating to set up the second encrypted communication channel.

Embodiments can have the advantage that personalization data, which are not comprised in plain text in the user certificate, are sent from the user computer system to the service server via the second encrypted communication channel after successful mutual authenticating. It can thus be avoided that personalization data is transmitted in plain text before the successful mutual authenticating, or it can at least be avoided that all personalization data are transmitted in plain text before the successful mutual authenticating. Embodiments can have the advantage that such personalization data forwarded via the second encrypted communication channel are secured by encrypting the second communication channel by means of the ephemeral key for encrypting the second communication channel.

According to embodiments, all personalization data are forwarded via the second encrypted communication channel in addition to the user certificate sent by the user computer system to the service server in the course of the mutual authenticating to set up the second encrypted communication channel. Embodiments can have the advantage that such personalization data forwarded via the second encrypted communication channel are secured by encrypting the second communication channel by means of the ephemeral key for encrypting the second communication channel.

According to embodiments, a one-way function is applied to at least part of the personalization data to be provided, that is, individually to the personalization data or to a combination of the personalization data, the result or results of which comprise the user certificate. According to embodiments, the one-way function is a hash function. According to embodiments, the user certificate comprises at least part of the personalization data to be provided, each as a hash value. According to embodiments, the user certificate comprises a hash value of a combination of at least part of the personalization data to be provided. According to embodiments, a one-way function is applied to all personalization data to be provided, that is, individually to the personalization data or to a combination of the personalization data, the result or results of which comprise the user certificate. According to embodiments, the user certificate comprises all personalization data to be provided, each as a hash value. According to embodiments, the user certificate comprises a hash value of a combination of all personalization data to be provided. Embodiments can have the advantage that such personalization data transmitted as hash values with the user certificate do not require any further securing, such as an encryption, since they cannot be reconstructed from the hash values. Nevertheless, the user certificate establishes a cryptographic link between the corresponding personalization data and the asymmetric cryptographic key pair, the public cryptographic key of which comprises the user certificate. If the personalization data are also forwarded to the service server via the second encrypted communication channel, the service server can decrypt the received personalization data using a corresponding ephemeral cryptographic key for encrypting the second communication channel, such as a symmetric ephemeral cryptographic key, and calculate one or more hash values therefrom. The calculated hash values can be compared with the hash values of the user certificate. If there is a match, the personalization data received is authentic. Furthermore, the signature of the personalization data can be decrypted with the public cryptographic key comprised in the user certificate as a signature verification key and the resulting hash value can be compared with the hash value of the personalization data received according to the user certificate and/or the hash value. If these match, the user who created the signature was authorized to use the corresponding personalization data and also agreed to their use by forwarding his signature.

According to embodiments, the user certificate is an X.509 certificate of version three or higher, which comprises the hash value or hash values of the personalization data to be provided as extensions.

According to embodiments, the personalization data source is a security element of the user computer system. The security element comprises a protected memory area in which the personalization data are stored.

A security element is understood as a protected element, that is, hardware, firmware or software element, which provides cryptographic means. Said cryptographic means are protected against manipulation and are only accessible to authorized services and applications, for example, via cryptographic keys. In particular, the cryptographic means can, for example, only be introduced into the security element, supplemented, changed and/or deleted by authorized services and applications. A security element therefore offers a platform secured against manipulation, for example, implemented in the form of a secure single-chip microcontroller, on which confidential and/or cryptographic data and/or program instructions are stored according to predefined rules and security requirements by reliably identified trustworthy entities and can thus be made available to authorized application programs and/or operating systems. A security element can be embedded or integrated, for example, detachable in a non-destructive manner or fixedly connected, that is, not detachable in a non-destructive manner. The security element can comprise a SIM, UICC, Smart-MicroSD, smart card, eSE, eSIM or eUICC, for example. For example, cryptographic keys are stored on a security element, that is, the security element comprises a data vault for cryptographic keys or a "key store". A key store can also be implemented as part of the main processor, for example, in a TEE (Trusted Execution Environment).

According to embodiments, the personalization data source is an ID token. The ID token comprises an electronic memory having a protected memory area in which the personalization data are stored. Furthermore, the ID token comprises a communication interface for communication with the user computer system.

An "ID token" is understood here as a device, such as a portable electronic device, for example, in the form of a so-called USB stick, a chip card, in particular with an RFID, USB and/or NFC interface, or a document.

A "document" is defined in particular as an identification, value or security document, in particular an official document, in particular a paper-based and/or plastic-based document, such as an electronic identification document, in particular a passport, identity card, visa, driver's license, vehicle registration document, health card, or a company ID card, or another ID document, a chip card, means of payment, in particular banknotes, bank cards or credit cards, bills of lading or other proof of authorization. In particular, the ID token can be a machine-readable travel document, such as that standardized by the International Aviation Authority (ICAO) and/or the BSI. The document has, for example, RFID, USB and/or NFC interfaces.

According to embodiments, the ID token does not have its own power supply. Instead, a device for "energy harvesting" of energy, which is transmitted from the user computer system to the ID token, such as an RFID antenna, can serve as the energy source. According to embodiments, the ID token has its own energy supply, such as an accumulator and/or a battery.

According to embodiments, the user computer system comprises a communication interface for communication with the ID token, for example, an RFID, USB and/or NFC interface. The communication between the user computer system and the ID token can be contactless or contact-based.

According to embodiments, the personalization data is read out from the personalization data source using an ID provider server. The reading out further comprises:

authenticating the ID provider server by the personalization data source using an ID provider server certificate of the ID provider server in the course of the setting up of a third encrypted communication channel between the personalization data source and the ID provider server via the user computer system and the network, the ID provider server certificate comprising read authorization for read access of the ID provider server to the personalization data stored in the protected memory area of the personalization data source, the authenticating comprising verifying the read authorization of the ID provider server by the personalization data source.

carrying out the read access of the ID provider server to the personalization data to be provided stored in the personalization source via the network and the user computer system, sending the read-out personalization data from the ID provider server to the service server via the network and the user computer system, the ID provider server sending the proof of authorization for the user to use the personalization data in the form of a signature of the read-out personalization data created using a signature key of the ID provider server, the signature of the ID provider server being a confirmation that the personalization data is personalization data that was read out from a personalization source over which the user has power of disposal.

Embodiments can have the advantage that an independent, trustworthy entity in the form of the ID provider server reads out the personalization data from the protected memory area of the personalization source, such as an ID token or a security element. On the one hand, this can increase the security of the personalization data in the personalization source, since reading out is only possible for entities which have a corresponding certificate or an authorization certificate with read authorization for read access of the ID provider server to the personalization data stored in the protected memory area of the personalization data source. In this case, the ID provider server further provides a proof of authorization for the user to use the personalization data in the form of a signature of the read-out personalization data created using a signature key, that is, a private cryptographic key, of the ID provider server. The service server can verify the validity of said signature using a corresponding signature verification key, that is, an associated public cryptographic key, the authenticity of which is verified, for example, by a certificate from the ID provider server. As a trustworthy entity, the ID provider server confirms that the personalization data provided has been read out from the personalization source. The fact that the read-out personalization data are unadulterated results from their signature and the user's power of disposal over the personalization source, which the user provides for reading out and with respect to which he performs authenticating on himself, proves the user's authorization for using the corresponding personalization data.

For example, mutual authenticating takes place between the personalization data source and the ID provider server using a certificate from the personalization data source and the ID provider server certificate. Embodiments can have the advantage that the ID provider server can thus ensure that it reads the right personalization data source, for example, the right security element or the right ID token.

An "ID provider server" is understood here as a server which is designed to carry out read access to a predefined personalization source provided by or via the user computer system via a network, such as the Internet, and to confirm the authenticity of the read-out personalization data.

Communication between the personalization source and the ID provider server takes place using the HTTPS protocol, for example. According to embodiments, the communication between the ID provider server and the service server is end-to-end encrypted, for example.

According to embodiments, the personalization data is provided, that is, the user is identified by the service server for the purpose of registration, on this web service online, for example, using the identification function of the German ID card, using the user computer system. The user computer system is, for example, a mobile, portable terminal device, a desktop computer or a self-service terminal, for example, in a registration office. According to embodiments, the service server or web service initializes the authentication token within the registration session for use for future authentication with respect to the service server or web service. The initialization comprises generating the server-specific key pair with the authentication key and the authenticating key.

According to embodiments, an ID application is used on the user computer system, the ID application setting up the second communication channel, receiving the first request, initiating the read-out of the personalization data to be provided and forwarding the read-out personalization data and the user's proof of authorization to use the read-out personalization data.

Communication between the ID application and the ID provider server takes place using the HTTPS protocol, for example. According to embodiments, the second encrypted communication channel is set up between the ID application of the user computer system and the service server as endpoints. According to embodiments, the communication between the ID application and the service server is end-to-end encrypted, for example.

According to embodiments, the registration web page comprises a link on the service server, under which a reading out of personalization data for personalizing the user account from an electronic personalization data source is initialized by the service server. According to embodiments, the link is called up by the browser application via the first encrypted communication channel. According to embodiments, the link is called up by the ID application via the first encrypted communication channel.

According to embodiments, the user computer system further receives a key ID generated by the authentication token for the server-specific cryptographic key pair consisting of authentication key and authenticating key together with the first challenge and forwards the key ID together with the first challenge to the service server.

Embodiments can have the advantage that the authentication token can also send the key ID for future authenticatings of the user of the personalized user account, so that the service server can use the key ID to determine which authenticating key is to be used for the authenticating by the service server and/or which personalized user account is assigned to the authenticating user.

According to embodiments, the authentication token generates the server-specific cryptographic key pair consisting of authentication key and authenticating key and the key ID and stores these in a memory of the authentication token. Embodiments can have the advantage that said data, such as the authentication key and key ID, are available to the authentication token for use in future user authentications. According to embodiments, the authentication token generates the first response to the first challenge received from the browser application, the authentication token signing the first challenge.

According to embodiments, the user computer system sends the unique service server attribute to the authentication token. According to embodiments, the authentication token stores the unique service server attribute. According to embodiments, the unique attribute is an identifier of the service server, for example, an address of the service server, for example, a domain name or sub-domain name.

According to embodiments, the authentication token is an external component or an internal component of the user computer system. The authentication token comprises a protected memory area in which the server-specific authentication key is stored. According to embodiments, the external authentication token comprises a communication interface via which external authentication token can communicate with the user computer system, for example, using Bluetooth, RFID, NFC or USB. Alternatively, the authentication token can be an internal token that is present in the user computer system itself. According to embodiments, the communication is contactless or contact-based.

In the case of an external component, the authentication token is configured, for example, as a portable electronic device, for example, as a so-called USB stick, a chip card, in particular with a Bluetooth, RFID, USB and/or NFC interface, or as a document.

A "document" is defined in particular as an identification, value or security document, in particular an official document, in particular a paper-based and/or plastic-based document, such as an electronic identification document, in particular a passport, identity card, visa, driver's license, vehicle registration document, health card, or a company ID card, or another ID document, a chip card, means of payment, in particular banknotes, bank cards or credit cards, bills of lading or other proof of authorization. In particular, the ID token can be a machine-readable travel document, such as that standardized by the International Aviation Authority (ICAO) and/or the BSI. The document has, for example, Bluetooth, RFID, USB and/or NFC interfaces.

According to embodiments, the authentication token does not have its own power supply. Instead, a device for "harvesting" of energy ("energy harvesting"), which is transmitted from the user computer system to the authentication token, such as an RFID antenna, can serve as the energy source. According to embodiments, the authentication token has its own energy supply, such as an accumulator and/or a battery.

In the case of an internal component, the authentication token is configured, for example, as a security element, that is, a protected element, such as a hardware, firmware or software element that provides cryptographic means. Said cryptographic means are protected against manipulation and are only accessible to authorized services and applications, for example, via cryptographic keys. In particular, the cryptographic means can, for example, only be introduced into the security element, supplemented, changed and/or deleted by authorized services and applications. A security element therefore offers a platform secured against manipulation, for example, implemented in the form of a secure single-chip microcontroller, on which confidential and/or cryptographic data and/or program instructions are stored according to predefined rules and security requirements by reliably identified trustworthy entities and can thus be made available to authorized application programs and/or operating systems. A security element can be embedded or integrated, for example, detachable in a non-destructive manner or fixedly connected, that is, not detachable in a non-destructive manner. The security element can comprise a SIM, UICC, SmartMicroSD, smart card, eSE, eSIM or eUICC, for example. For example, cryptographic keys are stored on a security element, that is, the security element comprises a data vault for cryptographic keys or a "key store". A key store can also be implemented as part of the main processor, for example, in a TEE (Trusted Execution Environment).

According to embodiments, the method for authenticating the user using the authentication key with respect to the service server further comprises:

receiving the second challenge from the service server by the user computer system, forwarding the second challenge from the user computer system to the authentication token, receiving a second response to the second challenge created by the authentication token by the user computer system, the second response comprising a signature of the second challenge with the server-specific authentication key of the authentication token, creating the second response requiring successful authenticating of the user with respect to the authentication token, forwarding the second response to the service server by the user computer system, the service server having the associated server-specific authenticating key for validating the second response provided by the user as a proof of authentication, and assigning the second response, in the event of successful validation, to the user's personalized user account.

Embodiments can have the advantage that a secure authentication or authenticating of the user is made possible by means of a challenge-response method.

According to embodiments, the user computer system sends the unique service server attribute to the authentication token together with the second challenge. According to embodiments, the user computer system receives the key ID of the server-specific cryptographic key pair together with the second response and forwards said key ID to the service server together with the second response.

Embodiments can have the advantage that the authentication token can, based on the unique service server attribute, determine which server-specific authentication key is to be used for authenticating the user with respect to the corresponding service server. Embodiments can have the advantage that the service server can, based on the key ID, determine which authenticating key is to be used by the service server for the authenticating of the user and/or which personalized user account is assigned to the user who is authenticating himself.

Embodiments comprise a user computer system having a processor, a memory with program instructions, and a communication interface. Execution of the program instructions by the processor causes the user computer system to execute a method for implementing an authentication mechanism. The authentication mechanism provided a personalized, server-specific authentication of a user with respect to a service server using an authentication token.

The method for implementing the authentication mechanism comprises:

calling up a registration web page provided by the service server for registering the user with the service server through the user computer system via a network using a browser application, in the course of the calling up of the registration web page, a first encrypted communication channel between the user computer system and the service server being set up, the user computer system authenticating the service server in the course of the setting up of the first encrypted communication channel using a service server certificate, the registration of the user comprising creating a personalized user account for the user through the service server, setting up a parallel second encrypted communication channel between the user computer system and the service server, in the course of the setting up of the second encrypted communication channel, a mutual authenticating of user and service server taking place using a user certificate and the service server certificate, receiving a first request from the service server by the user computer system for providing personalization data of the user for personalizing the user account, initiating a read-out of the personalization data to be provided by the user computer system from an electronic personalization data source, a read-out of the personalization data to be provided requiring a successful authentication of the user with respect to the personalization data source, forwarding of the read-out personalization data from the personalization data source by the user computer system to the service server via the second encrypted communication channel, forwarding of a proof of authorization of the user to use the personalization data as his own personalization data by the user computer system to the service server via the second encrypted communication channel, receiving a second request from the service server by the user computer system using the browser application via the first encrypted communication channel for providing a server-specific authenticating key for the future authenticating of the user of the personalized user account, the second request comprising a first challenge, forwarding the first challenge from the user computer system to an authentication token of the user, receiving a first response to the first challenge created from the authentication token by the user computer system together with a server-specific authenticating key for the service server in the form of a public cryptographic key of an asymmetric cryptographic key pair generated from the authentication token using a unique service-server attribute, the first response comprising a signature of the first challenge with a server-specific authentication key associated with the authenticating key in the form of a private cryptographic key of the generated asymmetric cryptographic key pair, a creation of the first response requiring successful authenticating of the user with respect to the authentication token, forwarding the first response and the server-specific authenticating key by the user computer system using the browser application via the first encrypted communication channel to the service server for storing the server-specific authenticating key in connection with the user's personalized user account, the first response serving as proof that the user has the authentication key associated with the authenticating key, the stored authenticating key enabling the service server to verify a validity of a second response provided by the user as a proof of authentication with a second signature of a second challenge from the service server in the course of future user authenticatings, which was created using the server-specific authentication key and assigned to the user's personalized user account.

According to embodiments, the user computer system is configured to execute any of the previously described embodiments of the method for implementing an authentication mechanism.

According to embodiments, the user computer system comprises the personalization data source. The personalization data source is, for example, a personalization data source that is configured to execute the method steps of the personalization data source according to any one of the previously described embodiments.

According to embodiments, the personalization data source is the memory of the user computer system. According to embodiments, the personalization data source is a security element of the user computer system.

According to embodiments, the user computer system comprises the authentication token. The authentication token is, for example, an authentication token which is configured to execute the method steps of the authentication token according to any one of the previously described embodiments. According to embodiments, the authentication token is a security element of the user computer system.

Embodiments comprise systems having a user computer system according to any one of the embodiments described above and the authentication token.

According to embodiments, the system is configured to execute any of the previously described embodiments of the method for implementing an authentication mechanism.

According to embodiments, the system further comprises the personalization data source. The personalization data source is, for example, a personalization data source that is configured to execute the method steps of the personalization data source according to any one of the previously described embodiments.

According to embodiments, the personalization data source is the memory of the user computer system. According to embodiments, the personalization data source is a security element of the user computer system. According to embodiments, the personalization data source is an ID token.

According to embodiments, the system further comprises the service server. The service server is, for example, a service server which is configured to execute the method steps of the service server according to any one of the previously described embodiments.

According to embodiments, the system further comprises an ID provider server. The ID provider server is, for example, an ID provider server which is configured to execute the method steps of the ID provider server according to any one of the previously described embodiments.

Figure 2:
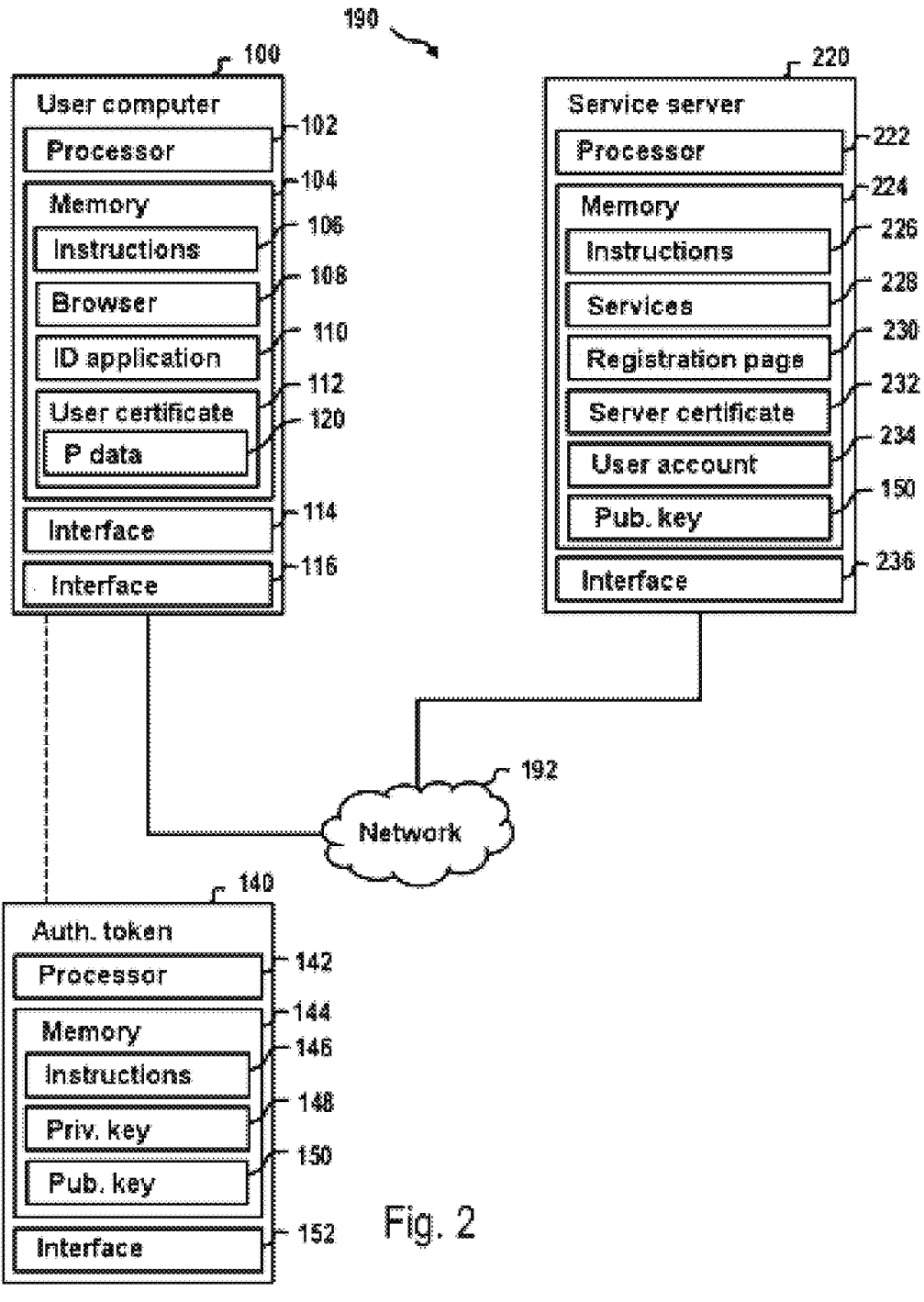
Figure 3:
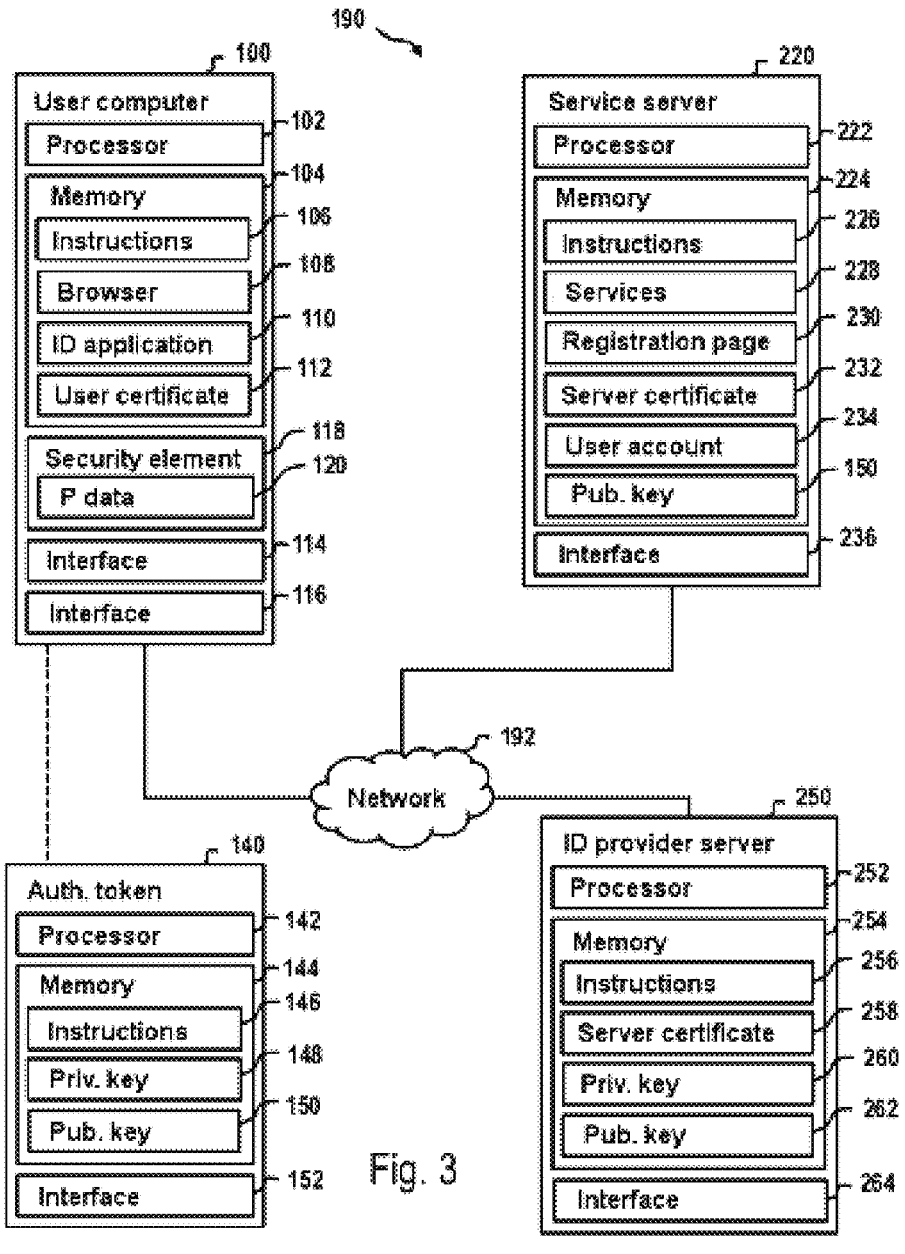
Figure 4:
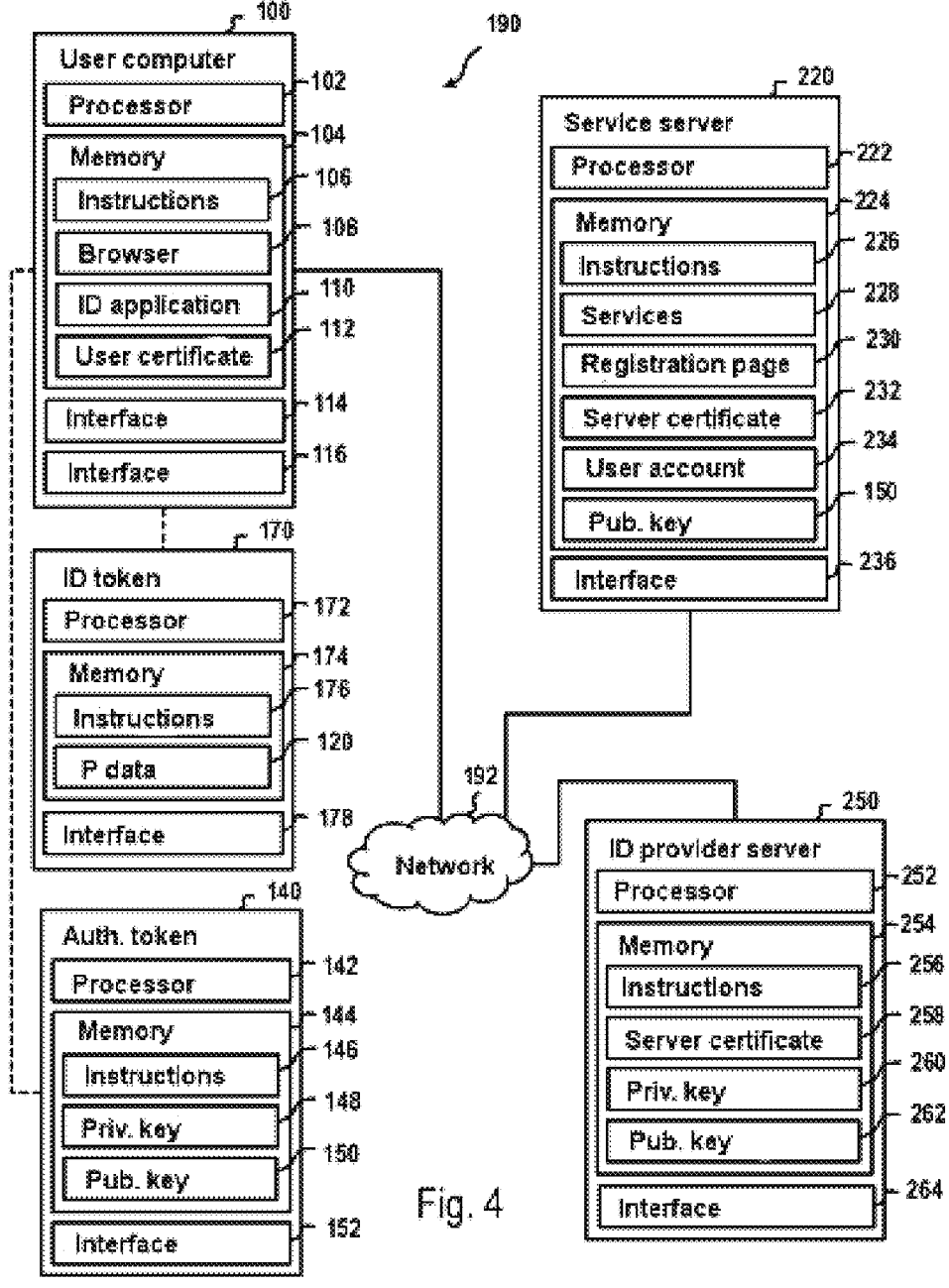
Figure 5:
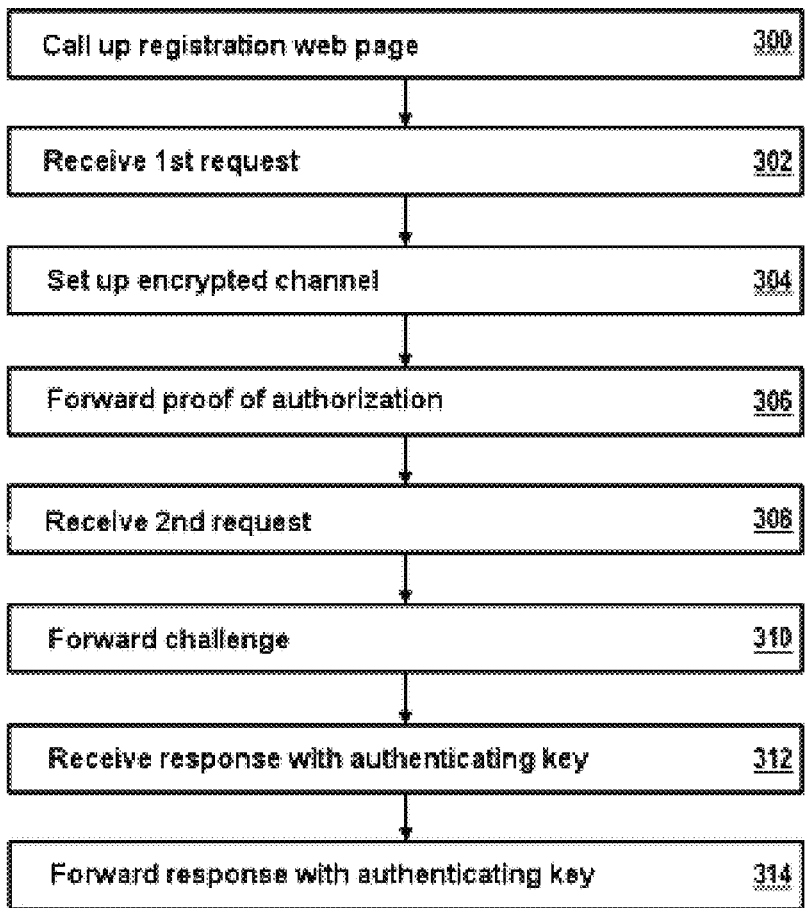
Figure 6:
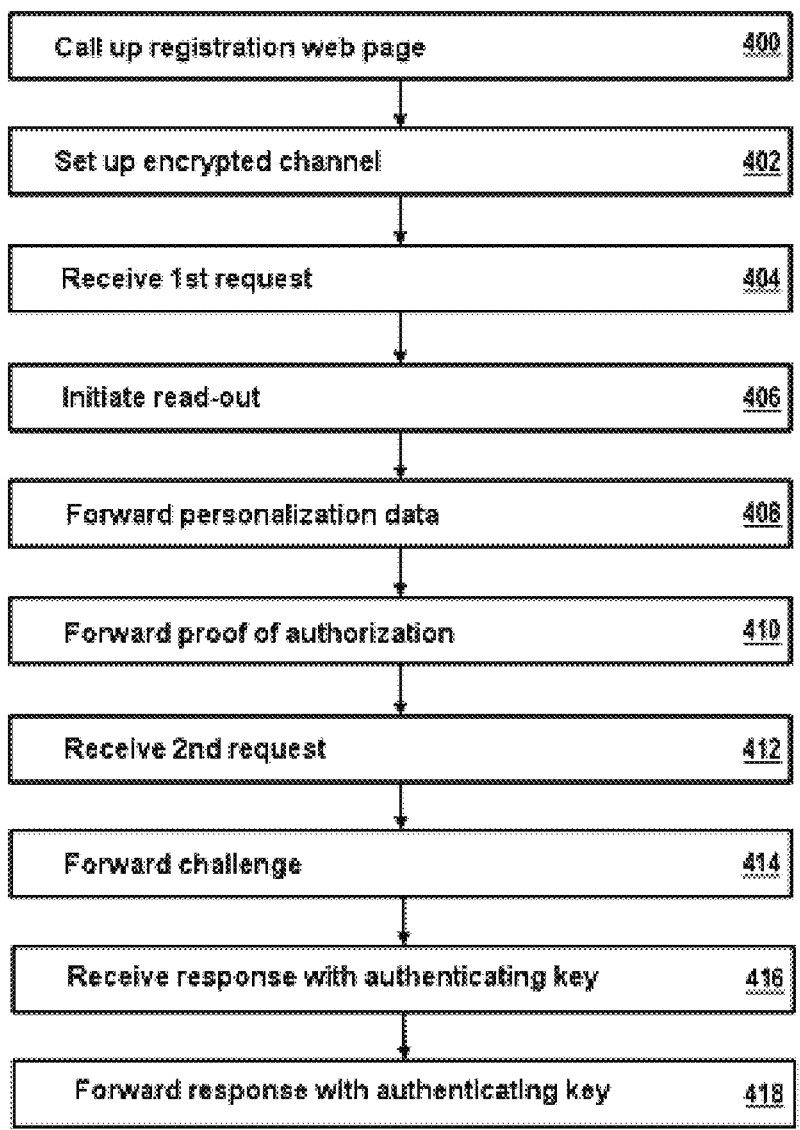
Figure 7:
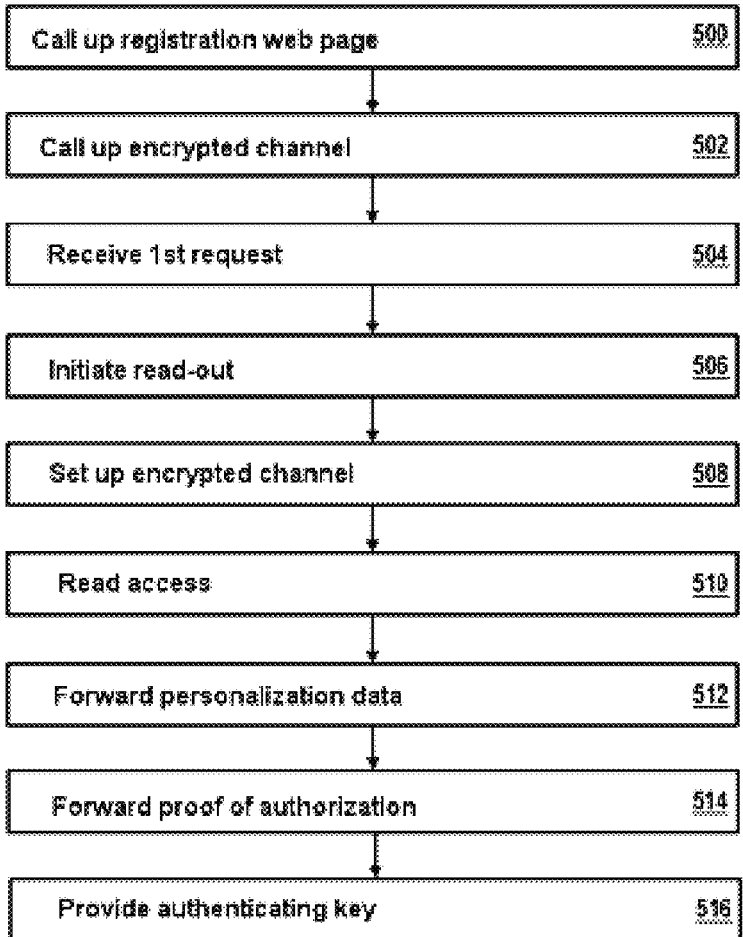
Figure 8:
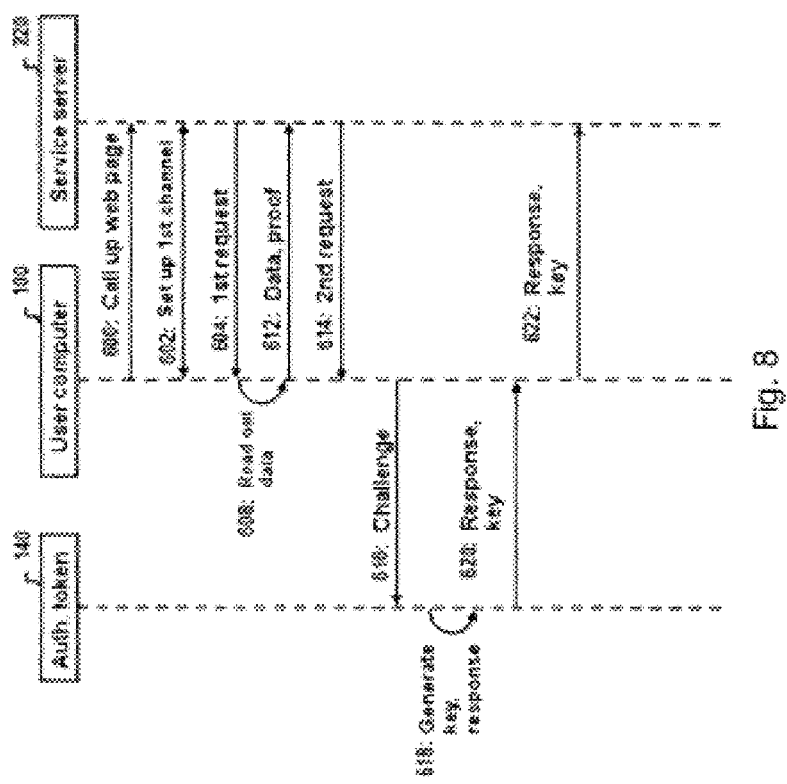
Figure 9:
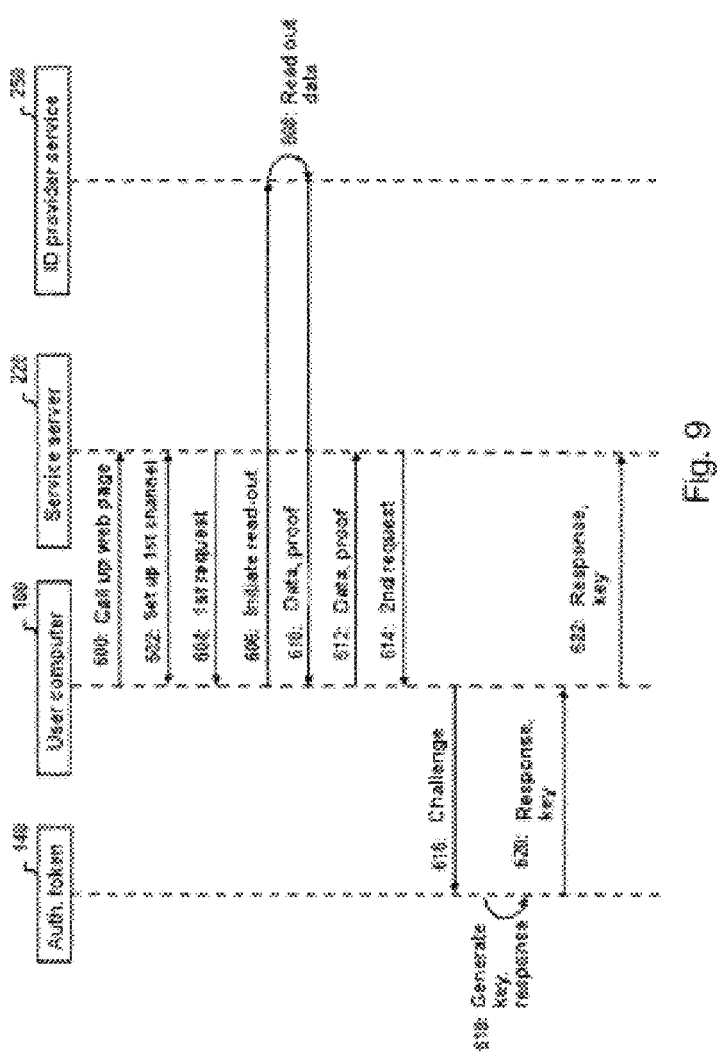
Figure 10:
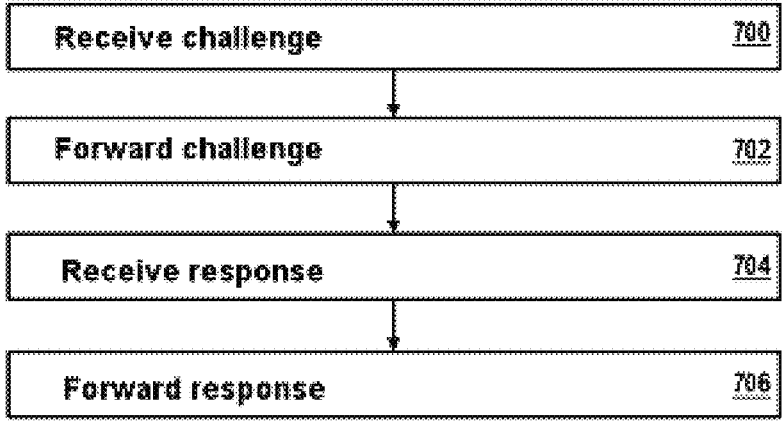

In the following, embodiments of the invention are explained in more detail with reference to the drawings. Shown are:

FIG. 1 a schematic block diagram of an embodiment of an exemplary system for implementing an authentication mechanism, FIG. 2 a schematic block diagram of an embodiment of an exemplary system for implementing an authentication mechanism, FIG. 3 a schematic block diagram of an embodiment of an exemplary system for implementing an authentication mechanism, FIG. 4 a schematic block diagram of an embodiment of an exemplary system for implementing an authentication mechanism, FIG. 5 a schematic flow diagram of an embodiment of an exemplary method for implementing an authentication mechanism, FIG. 6 a schematic flow diagram of an embodiment of an exemplary method for implementing an authentication mechanism, FIG. 7 a schematic flow diagram of an embodiment of an exemplary method for implementing an authentication mechanism, FIG. 8 a schematic flow diagram of an embodiment of an exemplary method for implementing an authentication mechanism, FIG. 9 a schematic flow diagram of an embodiment of an exemplary method for implementing an authentication mechanism, and FIG. 10 a schematic flow diagram of an embodiment of an exemplary method for authenticating a user.

Elements of the following embodiments that correspond to one another are identified with the same reference numbers.

FIG. 1 shows an embodiment of an exemplary system 190 having a user computer system 100 and a service server 220 for implementing an authentication mechanism. The user computer system 100 comprises a processor 102, a memory 104 with program instructions 106, and a communication interface 114 for communication via a network 192, such as the Internet. An execution of the program instructions 106 by the processor 102 can cause the user computer system 100 to call up a web page of the service server 220 using a browser application 108, for example, a registration web page 230 provided by the service server 220.

The service server 220 comprises, for example, a processor 222, a memory 224 with program instructions 226 and a communication interface 236 for communication via a network 192. An execution of the program instructions 226 by the processor 222 can cause the service server 220 to provide services via the network 192 which, for example, the user computer system 100 or which a user using the user computer system 100 can make use of. For this purpose, it may be necessary to implement an authentication mechanism for the user with respect to the service server 220. For this purpose, the service server 220 provides a registration web page 230 for the user computer system 100 for calling up via the network 192. In the course of the user computer system 100 calling up the registration web page 230, an encrypted communication channel is set up between the user computer system 100, for example, the browser application 108, and the service server 220 via the network 192. For this purpose, the service server 220 comprises, for example, a service server certificate 232 for authentication with respect to the user computer system 100. The registering of the user comprises, for example, a creation of a personalized user account 234.

For a personalization of said user account 234, the service server 220 needs personalization data 120 of the user, which this makes available to the service server 220 via the network 192, for example, using a user certificate 112. The user certificate 112 is sent, for example, in the course of a mutual authenticating of user computer system 100 and service server 220, to the service server 220 via the network 192 for setting up a parallel encrypted communication channel between the user computer system 100, for example, the browser application 108 or an ID application 110, and the service server 220. If the user certificate 112 comprises all personalization data 120 to be provided in plain text, user computer system 100 sends, for example, only proof of authorization to use the personalization data 120 already sent, for example, in the form of a signature of personalization data 120, via the encrypted communication channel to service server 220. If the user certificate 112 comprises, for example, hash values of all personalization data 120 to be provided, but none or not all personalization data 120 to be provided in plain text, at least the personalization data 120 not comprised or also all personalization data 120 to be provided are additionally sent to the service server 220 via the encrypted communication channel. For reading out the personalization data 120 from the memory 104, a successful authenticating of the user by the user computer system 100 and/or by the memory 104 or a control element of the memory 104 may be necessary. For this purpose, the user computer system 100 can comprise an authenticating sensor, for example. The service server 220 verifies the proof of authorization and uses the personalization data 120, in the event of a successful verification, to personalize the user account 234.

Furthermore, the service server 220 can request the user computer system 100 for providing a server-specific authenticating key 150 in the form of a public cryptographic key for future authenticating of the user of the user account 234. The user computer system 100 uses an authentication token 140 for creating the authenticating key 150 and for storing and managing an associated authentication key 148 in the form of a private cryptographic key. The user computer system 100 can comprise this as a security element, for example. The authentication token 140 comprises, for example, a memory with program instructions 146, the execution of which causes the authentication token 140 to generate a server-specific asymmetric key pair having the authentication key 148 and the authenticating key 150. Alternatively, a corresponding memory can be assigned to the authentication token 140, to which memory the authentication token 140 has exclusive access rights, for example. According to embodiments, the security element comprises its own processor for this purpose. Executing the program instructions 146 can further cause the authentication token 140 to sign a challenge received from the service server 220 in the course of a challenge-response protocol using the authentication key 148 generated. The signed challenge can be sent as a response together with the authenticating key 150 from the user computer system 100 to the service server 220. The service server 220 verifies the signature and stores the authenticating key 150 in connection with the user account 234 for future authenticating of the user.

FIG. 2 shows an alternative embodiment of an exemplary system 190 having a user computer system 100 and a service server 220 for implementing an authentication mechanism, which is broadly identical to the embodiment of FIG. 1. In this embodiment, the authentication token 140 is configured as an external component with a processor 142 and a communication interface 152 for communication with a communication interface 116 of the user computer system 100. The communication via the communication interfaces 116, 152 can take place, for example, according to the Bluetooth, RFID or NFC standard. Alternatively, the communication can take place, for example, according to the USB standard.

FIG. 3 shows an alternative embodiment of an exemplary system 190 having a user computer system 100, a service server 220 and an ID provider server 250 for implementing an authentication mechanism, which is broadly identical to the embodiment of FIG. 2. In this embodiment, the personalization data 120 is read out by the ID provider server 250, which makes the read-out personalization data 120 available to the service server 220 via the user computer system 100.

The personalization data 120 are stored in a security element 118 of the user computer system 100 to which the ID provider server 250 has an access right proven by an ID provider server certificate 258. The ID provider server 250 comprises a processor 252, a memory 254 with program instructions 256 and a communication interface 264 for communication via the network 192. An execution of program instructions 256 by the processor 252 can cause the ID provider server 250 to read out personalization data 120 from security element 118 of user computer system 100 and provide said personalization data to service server 220 for personalizing the user account 234. For example, the user computer system 100 forwards the request of the service server 220 for providing the personalization data 120 to the ID provider server 250. The ID provider server 250 sets up an encrypted communication channel to the security element 118 via the network 192. The ID provider server 250 authenticates itself with respect to the security element 118 with its ID provider server certificate 258, which proves that the ID provider server 250 has a right of access to the personalization data 120 to be provided. For example, a mutual authenticating takes place between security element 118 and ID provider server 250. In this case, the security element 118 also has a certificate. After a successful verification of the access authorization using the ID provider server certificate 258, the ID provider server 250 reads out the personalization data 120 to be provided via the network 192, signs said personalization data with a signature key 260, that is, a private cryptographic key, and sends the read-out personalization data 120 together with the created signature via the user computer system to the service server 220. The signature of the personalization data 120 read out can be verified, for example, with a signature verification key 262 belonging to the signature key 260, that is, a public cryptographic key. The ID provider server 250 provides said signature verification key 262 to the service server 220, for example, as part of a corresponding certificate which proves the authenticity of the signature verification key 262.

FIG. 4 shows an alternative embodiment of an exemplary system 190 having a user computer system 100, a service server 220, an ID provider server 250 and an ID token 170 for implementing an authentication mechanism, which largely corresponds to the embodiment of FIG. 3. In this embodiment, the personalization data source is configured as a standalone ID token 170 in the memory 174 of which the personalization data 120 are stored. The ID token 170 comprises a processor 172, the memory 174 with program instructions 176 and a communication interface 178. The communication interface 178 is configured to communicate with the communication interface 116 of the user computer system 100. The communication via the communication interfaces 116, 178 can take place, for example, according to the Bluetooth, RFID or NFC standard. Alternatively, the communication can take place, for example, according to the USB standard. An execution of the program instructions 176 by the processor 172 can cause the ID token 170 to grant the ID provider server 250 read access to the personalization data 120 upon a successful proof of an access authorization.

FIG. 5 shows an embodiment of an exemplary method for implementing an authentication mechanism. In block 300, the user computer system calls a registration web page provided by the service server for registering the user with the service server via a network using a browser application. in the course of the calling up the registration web page, a first encrypted communication channel is set up between the user computer system and the service server, which comprises, for example, an authenticating of the service server using a service server certificate. The registering of the user comprises a creation of a personalized user account for the user through the service server. In block 302, a first request from the service server is received by the user computer system for providing personalization data of the user for personalizing the user account. In block 304, a parallel second encrypted communication channel is set up between the user computer system, for example, the browser application, and the service server. in the course of the setting up of the second encrypted communication channel, for example, the user and the service server undergo mutual authenticating using a user certificate and the service server certificate. For example, the user certificate sent to the service server in the course of the mutual authenticating comprises the personalization data to be provided in plain text. The user certificate is read out from a memory of the user computer system as a personalization data source. Said read-out requires, for example, successful authenticating of the user with respect to the user computer system and thus to the memory of the user computer system. In block 306, a proof of authorization in the form of a signature of the personalization data to be provided is created with a signature key of the user associated with the user certificate, that is, a corresponding private cryptographic key, and forwarded to the service server. In block 308, a second request is received from the service server by the user computer system using the browser application via the first encrypted communication channel. The second request asks for the provision of a server-specific authenticating key for the future authenticating of the user of the personalized user account. Furthermore, the second request comprises a challenge, for example. In block 310, the user computer system forwards the first challenge to the authentication token, for example, together with a unique service server attribute. In block 312, the user computer system receives a response to the challenge from the authentication token together with a server-specific authenticating key for the service server in the form of a public cryptographic key of an asymmetric cryptographic key pair generated by the authentication token using the unique service-server attribute. Furthermore, the user computer system receives, for example, a key ID for identifying the server-specific, asymmetric cryptographic key pair generated by the authentication token. The response comprises a signature of the first challenge with a server-specific authentication key associated with the authenticating key in the form of a private cryptographic key of the generated asymmetric cryptographic key pair. For example, creating the first response requires the user to undergo successful authenticating with respect to the authentication token. In block 314, the user computer system, using the browser application, forwards the response with the server-specific authenticating key and, for example, the key ID via the first encrypted communication channel to the service server for storing the server-specific authenticating key in connection with the user's personalized user account. The first response serves as proof that the user has the authentication key associated with the authenticating key.

FIG. 6 shows an embodiment of an exemplary method for implementing an authentication mechanism. In block 400, the user computer system calls a registration web page provided by the service server for registering the user with the service server via a network using a browser application. in the course of the calling up the registration web page, a first encrypted communication channel is set up between the user computer system and the service server, which comprises, for example, an authenticating of the service server using a service server certificate. The registering of the user comprises a creation of a personalized user account for the user through the service server. In block 402 a parallel second encrypted communication channel is set up between the user computer system, for example, the browser application or an ID application and the service server. in the course of the setting up of the second encrypted communication channel, for example, the user and the service server undergo mutual authenticating using a user certificate and the service server certificate. The setting up of the second encrypted communication channel can comprise, for example, calling up a link from the service server comprised on the registration web page, the link being called up directly by the browser application, for example, or being forwarded to the ID application for calling up. In block 404, a first request from the service server is received by the user computer system for providing personalization data of the user for personalizing the user account. In block 406, the user computer system initiates a reading out of the personalization data to be provided from an electronic personalization data source. The personalization data source is, for example, the memory of the user computer system. Said read-out requires, for example, successful authenticating of the user with respect to the user computer system and thus to the memory of the user computer system. If one or more of the personalization data to be provided are already comprised in the user certificate sent to the service server in the course of the mutual authenticating, only the personalization data not comprised are read out from the personalization data source, for example. In block 408, the read-out personalization data are forwarded by the user computer system to the service server via the second encrypted communication channel. In block 410, a proof of authorization in the form of a signature of the personalization data to be provided is created with a signature key of the user associated with the user certificate, that is, a corresponding private cryptographic key, and forwarded to the service server. For example, the user certificate comprises hash values for all personalization data to be provided, for example, either in the form of a plurality of hash values each with hash values for individual personalization data or one hash value for a combination of the personalization data. Blocks 412 through 418 correspond to blocks 308 through 314 of the method of FIG. 5.

FIG. 7 shows an embodiment of an exemplary method for implementing an authentication mechanism. Blocks 500 through 504 correspond to blocks 400 through 404 of the method of FIG. 6. In block 506, the user computer system initiates a reading out of the personalization data to be provided from an electronic personalization data source. The personalization data source is, for example, a security element of the user computer system or an ID token that is in communication with the user computer system. The personalization data source is read out from an ID provider server. For example, the user computer system forwards the first request to the ID provider server. In block 508, a third encrypted communication channel is set up between the personalization data source and the ID provider server via the user computer system and the network. Here, the ID provider server undergoes authenticating by the personalization data source using an ID provider server certificate of the ID provider server. The ID provider server certificate comprises read authorization for a read access of the ID provider server to the personalization data stored in the protected memory area of the personalization data source. The authenticating comprises verifying the read authorization of the ID provider server through the personalization data source. For example, mutual authenticating takes place between the personalization data source and the ID provider server using a certificate from the personalization data source and the ID provider server certificate. In block 510, the ID provider server has read access to the personalization data to be provided stored in the personalization source via the network and the user computer system.

In block 512, the read-out personalization data is forwarded from the ID provider server to the service server via the network and the user computer system. In block 514, the ID provider server sends a proof of authorization for the user to use the personalization data in the form of a signature of the read-out personalization data created using a signature key of the ID provider server to the service server. This takes place, for example, together with the sending of the read-out personalization data. The signature of the ID provider server is a confirmation that the personalization data is personalization data that was read out from a personalization source over which the user has power of disposal. In block 516, the user computer system provides a server-specific authenticating key using the authentication token for the service server. The block 516 corresponds to the blocks 308 to 314 of the method from FIG. 5 or the blocks 412 to 318 of the method from FIG. 6.

FIG. 8 shows an embodiment of an exemplary method for implementing an authentication mechanism. In step 600, the user computer system 100 calls up the registration web page of the service server 220. In step 602, a first encrypted communication channel between the user computer system 100 and the service server 220 is set up. In step 604, the user computer system 100 receives a request for reading out the personalization data to be provided, which the user computer system 100 reads out in step 608 from a personalization data source, for example, a memory of the user computer system 100. In step 612, the read-out personalization data are forwarded to the service server 220 together with a proof of authorization for using the read-out personalization data, such as a signature by the user computer system 100. In step 614, the user computer system 100 receives a request for providing a server-specific authenticating key for the service server 220, for example, in the form "[ConnTLS1_WS(CertWS)] HTTPS 200<Challenge, User-ID, WS-FIDO-Register-Endpoint>""in response to a "[ConnTLS1_WS(CertWS)] HTTPS GET/WS-Endpoint". The request comprises a challenge, for example, which is forwarded in step 616 by the user computer system 100 to an authentication token 140, for example, in the form "[Browser-Api]<Domain, Challenge, User-ID>". In step 618, the authentication token 140 then generates a server-specific asymmetric key pair having an authentication key and an authenticating key. Furthermore, the authentication token 140 generates, for example, a key ID for the server-specific asymmetric key pair. The generated data are stored, for example, and the response to the challenge is created in the form of a signature of the challenge with the authentication key. In step 620, the authentication token 140 sends the response, the authenticating key and, for example, the key ID to the user computer system 100. This is done, for example, in the form "[Browser-Api]<ID, pubKey, Signature>". In step 622, the user computer system 100 forwards the data received in step 620 to the service server 220, for example, in the form "ConnTLS1_WS(CertWS)] HTTPS GET/WS-FIDO-Register-Endpoint<ID, pubKey Signature>". According to embodiments, the service server 220 confirms to the user computer system 100 the receipt of the forwarded data, for example, in the form "[ConnTLS1_WS (CertWS)] HTTPS 200".

FIG. 9 shows an embodiment of an exemplary method for implementing an authentication mechanism, which is an alternative embodiment of the method of FIG. 8 using an ID provider server 250. In step 600, the user computer system 100 calls up the registration web page of the service server 220. In step 602, a first encrypted communication channel between the user computer system 100 and the service server 220 is set up. In step 604, the user computer system 100 receives a request for reading out the personalization data to be provided. In step 606, the user computer system 100 initiates a reading out of the personalization data to be provided from a personalization data source, such as a security element of user computer system 100 or an ID token that is in communication with the user computer system 100, by an ID provider server 250. For example, the user computer system 100 forwards the request to the ID provider server 250. In step 608, the ID provider server 250 reads out the personalization data to be provided from the personalization data source, for example, via the network and the user computer system 100. In step 610, the read-out personalization data are sent together with a proof of authorization for using the read-out personalization data, such as a signature by the ID provider server 250, to the user computer system 100 and forwarded by said user computer system in step 612 to the service server 220. In step 614, the user computer system 100 receives a request for providing a server-specific authenticating key for the service server 220, for example, in the form "[ConnTLS1_WS(CertWS)] HTTPS 200<Challenge, User-ID, WS-FIDO-Register-Endpoint>""in response to a "[ConnTLS1_WS(CertWS)] HTTPS GET/WS-Endpoint". The request comprises a challenge, for example, which is forwarded in step 616 by the user computer system 100 to an authentication token 140, for example, in the form "[Browser-Api]<Domain, Challenge, User-ID>". In step 618, the authentication token 140 then generates a server-specific asymmetric key pair having an authentication key and an authenticating key. Furthermore, the authentication token 140 generates, for example, a key ID for the server-specific asymmetric key pair. The generated data are stored, for example, and the response to the challenge is created in the form of a signature of the challenge with the authentication key. In step 620, the authentication token 140 sends the response, the authenticating key and, for example, the key ID to the user computer system 100. This is done, for example, in the form "[Browser-Api]<ID, pubKey, Signature>". In step 622, the user computer system 100 forwards the data received in step 620 to the service server 220, for example, in the form "ConnTLS1_WS(CertWS)] HTTPS GET/WS-FIDO-Register-Endpoint<ID, pubKey Signature>". According to embodiments, the service server 220 confirms to the user computer system 100 the receipt of the forwarded data, for example, in the form "[ConnTLS1_WS(CertWS)] HTTPS 200".

FIG. 10 shows an embodiment of an exemplary method for authenticating a user. In block 700, the user computer system receives challenges from the service server for authenticating the user. For example, in response to calling up a web page of the service server, said web page requires an authenticating of the user, for example, in the course of the user registering with the service server. In block 702, the user computer system forwards the challenge to the authentication token, for example, together with a unique service server attribute. In block 704, the user computer system receives a response to the challenge from the authentication token. The authentication token determines, for example, using the unique service server attribute, a server-specific authentication key stored for said service server. The authentication token signs the challenge with said server-specific authentication key after the user has undergone successful authenticating of himself with respect to the authentication token, for example. Furthermore, the user computer system receives from the authentication token, for example, a key ID of the key pair, the server-specific authentication key of which was used for the signature. In block 706, the user computer system forwards the response, for example, together with the key ID, which is, for example, a random number, to the service server. The service server has the associated server-specific authenticating key for validating the provided by the user as proof of authentication. The service server determines the authenticating key to be used, for example, using the key ID. In the event of a successful validation, the response and thus the user are assigned to the personalized user account in connection with which the authenticating key used is stored on the part of the service server.

LIST OF REFERENCE NUMBERS

100 user computer system
102 processor
104 memory
106 program instructions
108 browser application
110 ID application
112 user certificate
114 communication interface
116 communication interface
120 personalization data
140 authentication tokens
142 processor
144 memory
146 program instructions
148 authentication key
150 authenticating key
152 communication interface
170 ID token
172 processor
174 memory
176 program instructions
178 communication interface
190 system
192 network
220 service server
222 processor
224 memory
226 program instruction
228 web services
230 registration web page
232 service server certificate
234 user account
236 communication interface
250 ID provider server
252 processor
254 memory
256 program instructions
258 ID provider server certificate
260 signature key
262 signature verification key
264 communication interface

The invention claimed is:

1. A method for implementing an authentication mechanism using a user computer system, the authentication mechanism providing a personalized, server-specific authentication of a user with respect to a service server using an authentication token, the method comprising:

calling up a registration web page provided by the service server for registering the user with the service server through the user computer system via a network using a browser application, in the course of the calling up the registration web page, a first encrypted communication channel being set up between the user computer system and the service server, the user computer system authenticating the service server in the course of the setting up of the first encrypted communication channel using a service server certificate, registering the user comprising creating a personalized user account for the user through the service server, setting up a parallel second encrypted communication channel between the user computer system and the service server, in the course of the setting up of the second encrypted communication channel, a mutual authenticating of user and service server taking place using a user certificate and the service server certificate, receiving a first request from the service server by the user computer system for providing the user's personalization data for personalizing the user account, initiating a read-out of the personalization data to be provided by the user computer system from an electronic personalization data source, a read-out of the personalization data to be provided requiring successful authentication of the user with respect to the personalization data source, forwarding the personalization data read out from the personalization data source by the user computer system to the service server via the second encrypted communication channel, forwarding of a proof of authorization of the user to use the personalization data as his own personalization data by the user computer system to the service server via the second encrypted communication channel, receiving a second request from the service server by the user computer system using the browser application via the first encrypted communication channel for providing a server-specific authenticating key for a future authenticating of the user of the personalized user account, the second request comprising a first challenge, forwarding the first challenge from the user computer system to an authentication token of the user, receiving, by the user computer system, a first response to the first challenge together with a server-specific authenticating key for the service server, the server-specific authenticating key in the form of a public cryptographic key of an asymmetric cryptographic key pair generated from the authentication token using a unique service-server attribute, the first response created from the authentication token, the first response comprising a signature of the first challenge with a server-specific authentication key associated with the authenticating key in the form of a private cryptographic key of the generated asymmetric cryptographic key pair, creating the first response requiring successful authenticating of the user with respect to the authentication token, forwarding, by the user computer system using the browser application via the first encrypted communication channel, the first response and the server-specific authenticating key to the service server for storing the server-specific authenticating key in connection with the personalized user account of the user, the first response serving as proof that the user has the server-specific authentication key associated with the authenticating key, the stored authenticating key enabling the service server to verify a validity of a second response provided by the user as proof of authentication with a second signature of a second challenge from the service server in the course of future user authenticatings, which was created using the server-specific authentication key and assigned to the user's personalized user account.

2. The method according to claim 1, wherein the personalization data source is a memory of the user computer system and the personalization data source is read out by the user computer system.

3. The method according to claim 1, wherein the user certificate comprises the user's personalization data to be provided and a public cryptographic key assigned to the user, wherein a signature of the personalization data created by the user computer system using a private cryptographic key associated with the public cryptographic key of the user is used as a proof of authorization for the user to use the personalization data.

4. The method according to claim 3, wherein the user certificate comprises at least part of the personalization data to be provided as plain text.

5. The method according to claim 4, wherein the user certificate comprises all personalization data to be provided as plain text, wherein the first request is received before the second encrypted communication channel is set up and the personalization data in the form of the user certificate are forwarded from the user computer system to the service server in the course of the mutual authenticating to set up the second encrypted communication channel.

6. The method according to claim 3, wherein the first request is received via the second encrypted communication channel and at least part of the personalization data is forwarded via the second encrypted communication channel in addition to the user certificate sent by the user computer system to the service server in the course of the mutual authenticating to set up the second encrypted communication channel.

7. The method according to claim 6, wherein the user certificate comprises at least part of the personalization data to be provided, each as a hash value.

8. The method according to claim 1, wherein the personalization data source is a security element of the user computer system, wherein the security element comprises a protected memory area in which the personalization data are stored.

9. The method according to claim 1, wherein the personalization data source is an ID token, wherein the ID token comprises an electronic memory having a protected memory area in which the personalization data is stored, wherein the ID token further comprises a communication interface for communication with the user computer system.

10. The method according to claim 8, wherein the personalization data is read out from the personalization data source using an ID provider server, wherein the reading out further comprises:

authenticating the ID provider server by the personalization data source using an ID provider server certificate of the ID provider server in the course of a setting up of a third encrypted communication channel between the personalization data source and the ID provider server via the user computer system and the network, wherein the ID provider server certificate comprises a read authorization for a read access of the ID provider server to the personalization data stored in the protected memory area of the personalization data source, wherein the authenticating comprises a verification of the read authorization of the ID provider server by the personalization data source, carrying out the read access of the ID provider server to the personalization data to be provided stored in the personalization source via the network and the user computer system, sending the read-out personalization data from the ID provider server to the service server via the network and the user computer system, wherein the ID provider server sends the proof of authorization for the user to use the personalization data in the form of a signature of the read personalization data created using a signature key of the ID provider server, wherein the signature of the ID provider server is a confirmation that the personalization data are personalization data that were read out from a personalization source over which the user has power of disposal.

11. The method according to claim 1, wherein an ID application is used on the user computer system, the ID application setting up the second communication channel, receiving the first request, initiating the reading out of the personalization data to be provided and forwarding the read-out personalization data and the user's proof of authorization to use the read-out personalization data.

12. The method according to claim 1, wherein the registration web page comprises a link of the service server, under which a reading out of personalization data for personalization of the user account from an electronic personalization data source by the service server is initialized.

13. The method according to claim 1, wherein the user computer system together with the first challenge further receives a key ID generated by the authentication token for the server-specific cryptographic key pair of authentication key and authenticating key and forwards the key ID together with the first challenge to the service server.

14. The method according to claim 1, wherein the authentication token is an external component or an internal component of the user computer system, wherein the authentication token comprises a protected memory area in which the server-specific authentication key is stored.

15. The method according to claim 1, wherein the method for authenticating the user with respect to the service server using the authentication key further comprises:

receiving the second challenge from the service server by the user computer system, forwarding the second challenge from the user computer system to the authentication token, receiving a second response to the second challenge created by the authentication token by the user computer system, wherein the second response comprises a signature of the second challenge with the server-specific authentication key of the authentication token, wherein a creation of the second response requires a successful authenticating of the user with respect to the authentication token, forwarding the second response by the user computer system to the service server, which has the associated server-specific authenticating key for validating the second response provided by the user as a proof of authentication and assigned the second response, in the event of a successful validation, to the user's personalized user account.

16. A user computer system comprising a processor, a memory with program instructions and a communication interface, an execution of the program instructions by the processor causing the user computer system to execute a method for implementing an authentication mechanism, the authentication mechanism providing a personalized, server-specific authentication of a user with respect to a service server using an authentication token, the method comprising:

calling up a registration web page provided by the service server for registering the user with the service server through the user computer system via a network using a browser application, in the course of the calling up the registration web page, a first encrypted communication channel being set up between the user computer system and the service server, the user computer system authenticating the service server in the course of the setting up of the first encrypted communication channel using a service server certificate, registering the user comprising creating a personalized user account for the user through the service server, setting up a parallel second encrypted communication channel between the user computer system and the service server, in the course of the setting up of the second encrypted communication channel, a mutual authenticating of user and service server taking place using a user certificate and the service server certificate, receiving a first request from the service server by the user computer system for providing the user's personalization data for personalizing the user account, initiating a read-out of the personalization data to be provided by the user computer system from an electronic personalization data source, a read-out of the personalization data to be provided requiring successful authentication of the user with respect to the personalization data source, forwarding the personalization data read out from the personalization data source by the user computer system to the service server via the second encrypted communication channel, forwarding of a proof of authorization of the user to use the personalization data as his own personalization data by the user computer system to the service server via the second encrypted communication channel, receiving a second request from the service server by the user computer system using the browser application via the first encrypted communication channel for providing a server-specific authenticating key for a future authenticating of the user of the personalized user account, the second request comprising a first challenge, forwarding the first challenge from the user computer system to an authentication token of the user, receiving, by the user computer system, a first response to the first challenge together with a server-specific authenticating key for the service server, the server-specific authenticating key in the form of a public cryptographic key of an asymmetric cryptographic key pair generated from the authentication token using a unique service-server attribute, the first response created from the authentication token, the first response comprising a signature of the first challenge with a server-specific authentication key associated with the authenticating key in the form of a private cryptographic key of the generated asymmetric cryptographic key pair, creating the first response requiring successful authenticating of the user with respect to the authentication token, forwarding, by the user computer system using the browser application via the first encrypted communication channel, the first response and the server-specific authenticating key to the service server for storing the server-specific authenticating key in connection with the personalized user account of the user, the first response serving as proof that the user has the server-specific authentication key associated with the authenticating key, the stored authenticating key enabling the service server to verify a validity of a second response provided by the user as proof of authentication with a second signature of a second challenge from the service server in the course of future user authenticatings, which was created using the server-specific authentication key and assigned to the user's personalized user account.

17. The user computer system according to claim 16, wherein the user computer system comprises the personalization data source.

18. The user computer system according to claim 16, wherein the user computer system further comprises the authentication token.

19. The user computer system according to claim 18, wherein the user computer system further comprises the personalization data source.

20. The user computer system according to claim 18, wherein the user computer system further comprises the service server.

21. The user computer system according to claim 18, wherein the user computer system further comprises an ID provider server.

* * * * *